(12) United States Patent
Cummins et al.

(10) Patent No.: US 6,278,864 B1
(45) Date of Patent: Aug. 21, 2001

(54) RADIO TRANCEIVER FOR DATA COMMUNICATIONS

(75) Inventors: James D. Cummins, Union City; Bradley E. Thomson, Redding; William F. Kern, Palo Alto; Duong X. Dinh, San Jose, all of CA (US)

(73) Assignee: Fujitsu Limited (Japan) (JP)

( * ) Notice: Subject to any disclaimer, the term of this patent is extended or adjusted under 35 U.S.C. 154(b) by 0 days.

(21) Appl. No.: 09/400,706

(22) Filed: Sep. 21, 1999

Related U.S. Application Data

(63) Continuation of application No. 08/425,635, filed on Apr. 20, 1995.

(51) Int. Cl.$^7$ ..................................................... H04B 1/38
(52) U.S. Cl. .............................. 455/73; 455/90; 455/260; 379/93
(58) Field of Search ................................... 455/78, 82, 83, 455/86, 74, 89, 90, 128, 95, 260, 265, 69; 235/492; 375/78; 379/93, 94, 99, 96, 97, 98

(56) References Cited

U.S. PATENT DOCUMENTS

| | | | |
|---|---|---|---|
| 3,568,151 | 3/1971 | Majima | 340/146.3 |
| 3,638,125 | 1/1972 | Goell | 325/320 |

(List continued on next page.)

FOREIGN PATENT DOCUMENTS

| | | | |
|---|---|---|---|
| 34 36 227 C2 | 4/1985 | (DE) | H01Q/9/04 |
| 0 434 231 | 6/1991 | (EP) . | |
| 0 473 297 | 3/1992 | (EP) . | |
| 0 629 071 | 12/1994 | (EP) . | |
| 04 104 646 | 4/1992 | (JP) . | |
| WO 95/02284 | 1/1995 | (WO) | H04B/1/38 |

OTHER PUBLICATIONS

John Q. Howell, "Microstrip Antennas", IEEE Transactions on Antennas and Propagation, Succinct Papers, Jan. 1975, pp. 90–93.
Search Results, Nerac Inc., Apr. 16, 1992, (2 pages).
Britton Sanderford, Jr., "New Markets Emerge as PCN Reduces Wireless link Costs", IEEE Communications Magazine, Jun. 1992, pp. 28–32.
Search Results, Nov. 7, 1993, pp. 1–5.
"2.4 GHz Wireless Link", Electronic Engineering times, Nov. 15, 1993, (1 page).
"Wireless–LAN Device", Electronic Engineering Times, Apr. 18, 1994, (1 page).
"Oscillator Measures 2.3mm in Height", Electronic Engineering Times, Sep. 5, 1994, (1 page).
"Proxim Deals OEM Modules", Electronic Engineering Times, Sep. 12, 1994, (1 page).
Jean–Louis Fourdan, "Simple, Homodyne Quartz–Locked FSK Detector", Mini–Ciricuits, Date Unknown, (1 page).

(List continued on next page.)

Primary Examiner—Daniel Hunter
Assistant Examiner—Darnell R Armstrong
(74) Attorney, Agent, or Firm—Skjerven Morrill MacPherson LLP; David W. Heid; Gary J. Edwards

(57) ABSTRACT

A compact low-power radio frequency (RF) transceiver with a built-in antenna provides wireless communication between a computer and another device. A direct conversion receiver together with a voltage controlled oscillator, phase lock loop circuits, digitally controlled divider circuits and a patch antenna are packaged into a compact enclosure, having dimensions within the PCMCIA format. In some embodiments, the transceiver enters a sleep mode whenever it is idle in order to further conserve power. In other embodiments, a signature detector enables the transceiver to distinguish between noise and valid messages by recognizing a signature word embedded in the data packet.

3 Claims, 32 Drawing Sheets

U.S. PATENT DOCUMENTS

| | | | |
|---|---|---|---|
| 3,798,561 | 3/1974 | Bocker | 329/104 |
| 3,803,492 | 4/1974 | Siglow et al. | 325/320 |
| 3,924,197 | 12/1975 | Okano et al. | 329/104 |
| 3,944,925 | 3/1976 | De Laune | 325/17 |
| 3,971,032 | 7/1976 | Munson et al. | 343/770 |
| 3,983,501 | 9/1976 | Lindstrum | 329/122 |
| 4,027,242 | 5/1977 | Yamanaka | 325/17 |
| 4,027,265 | 5/1977 | Kobayashi et al. | 329/122 |
| 4,053,836 | 10/1977 | Fellrath | 325/320 |
| 4,068,198 | 1/1978 | Otto | 332/19 |
| 4,087,677 | 5/1978 | Dunn et al. | 325/30 |
| 4,096,442 | 6/1978 | McRae et al. | 329/112 |
| 4,097,805 | 6/1978 | Fujii et al. | 325/17 |
| 4,156,867 | 5/1979 | Bench et al. | 340/146.1 AL |
| 4,158,105 | 6/1979 | Otani et al. | 178/69.1 |
| 4,162,446 | 7/1979 | Cochran | 325/15 |
| 4,186,348 | 1/1980 | Lautier et al. | 325/320 |
| 4,194,151 | 3/1980 | Gregersen et al. | 455/76 |
| 4,217,551 | 8/1980 | Entenman | 375/88 |
| 4,224,575 | 9/1980 | Mosley et al. | 329/50 |
| 4,234,854 | 11/1980 | Schellenberg et al. | 330/286 |
| 4,267,591 | 5/1981 | Wissel et al. | 370/11 |
| 4,270,206 | 5/1981 | Hughes | 375/9 |
| 4,311,964 | 1/1982 | Boykin | 329/104 |
| 4,320,345 | 3/1982 | Waggener | 329/50 |
| 4,336,500 | 6/1982 | Attwood | 329/50 |
| 4,348,757 | 9/1982 | Richardson | 370/32 |
| 4,353,127 | 10/1982 | Richardson | 370/32 |
| 4,355,404 | 10/1982 | Uzunoglu | 375/86 |
| 4,357,605 | 11/1982 | Clements | 340/825.14 |
| 4,387,342 | 6/1983 | Grosjean | 329/50 |
| 4,404,685 | 9/1983 | Rogers | 455/76 |
| 4,414,675 | 11/1983 | Comroe | 375/90 |
| 4,439,737 | 3/1984 | Mattei | 329/50 |
| 4,446,066 | 5/1984 | Luijerink | 260/112 B |
| 4,447,909 | 5/1984 | Hjorring | 375/88 |
| 4,457,005 | 6/1984 | Burke et al. | 375/82 |
| 4,470,145 | 9/1984 | Williams | 375/1 |
| 4,475,218 | 10/1984 | Takeda et al. | 375/81 |
| 4,475,219 | 10/1984 | Puckette | 375/82 |
| 4,485,347 | 11/1984 | Hirasawa et al. | 329/50 |
| 4,486,715 | 12/1984 | Maas et al. | 329/50 |
| 4,488,120 | 12/1984 | Carsten | 329/122 |
| 4,499,425 | 2/1985 | Maas | 329/50 |
| 4,518,922 | 5/1985 | Luecke | 329/50 |
| 4,540,948 | 9/1985 | Ryu | 329/122 |
| 4,543,541 | 9/1985 | Norton | 332/16 R |
| 4,549,302 | 10/1985 | Heatherington | 375/8 |
| 4,551,689 | 11/1985 | Scala et al. | 331/2 |
| 4,564,842 | 1/1986 | Suzuki | 343/700 MS |
| 4,567,603 | 1/1986 | Howell et al. | 375/65 |
| 4,571,783 | 2/1986 | Vance | 375/82 |
| 4,575,684 | 3/1986 | Stamm | 329/122 |
| 4,605,903 | 8/1986 | Ihle | 329/50 |
| 4,608,699 | 8/1986 | Batlivala et al. | 375/5 |
| 4,612,509 | 9/1986 | Betts et al. | 329/50 |
| 4,614,910 | 9/1986 | Ishigaki et al. | 329/50 |
| 4,616,187 | 10/1986 | Watanabe | 329/126 |
| 4,617,526 | 10/1986 | Hikawa et al. | 331/1 A |
| 4,618,997 | 10/1986 | Imazeki et al. | 455/76 |
| 4,631,486 | 12/1986 | Snell | 329/50 |
| 4,634,990 | 1/1987 | Tate et al. | 329/126 |
| 4,639,682 | 1/1987 | Takeuchi | 329/50 |
| 4,649,551 | 3/1987 | Sander et al. | 375/81 |
| 4,669,094 | 5/1987 | Van Rumpt | 375/88 |
| 4,670,887 | 6/1987 | Heatherington | 375/84 |
| 4,672,640 | 6/1987 | Meek et al. | 375/120 |
| 4,675,883 | 6/1987 | Thannhaeuser et al. | 375/83 |
| 4,682,118 | 7/1987 | Thiel | 329/122 |
| 4,703,520 | 10/1987 | Rozanski, Jr. et al. | 455/76 |
| 4,707,832 | 11/1987 | Glenn et al. | 370/124 |
| 4,709,237 | 11/1987 | Poullain et al. | 342/203 |
| 4,715,047 | 12/1987 | Hambley | 375/84 |
| 4,737,968 | 4/1988 | Norton et al. | 375/60 |
| 4,740,997 | 4/1988 | Heatherington | 375/82 |
| 4,745,627 | 5/1988 | Gubser | 375/88 |
| 4,752,742 | 6/1988 | Akaiwa | 329/105 |
| 4,771,291 | 9/1988 | Lo et al. | 343/700 MS |
| 4,783,661 | 11/1988 | Smith | 343/700 MS |
| 4,802,235 | 1/1989 | Treatch | 455/76 |
| 4,813,058 | 3/1989 | Takase | 375/82 |
| 4,816,769 | 3/1989 | Ma et al. | 329/50 |
| 4,825,452 | 4/1989 | Wong | 375/22 |
| 4,827,271 | 5/1989 | Berneking et al. | 343/700 MS |
| 4,829,543 | 5/1989 | Borth et al. | 375/83 |
| 4,847,868 | 7/1989 | Hedberg et al. | 375/75 |
| 4,856,027 | 8/1989 | Nakamura et al. | 375/81 |
| 4,870,659 | 9/1989 | Oishi et al. | 375/82 |
| 4,870,660 | 9/1989 | Keate | 375/88 |
| 4,871,975 | 10/1989 | Nawata et al. | 329/124 |
| 4,878,035 | 10/1989 | Vendely et al. | 332/101 |
| 4,882,552 | 11/1989 | Harris | 332/100 |
| 4,894,845 | 1/1990 | Janssen et al. | 375/83 |
| 4,901,332 | 2/1990 | Williams et al. | 375/81 |
| 4,902,979 | 2/1990 | Puckette, IV | 329/343 |
| 4,914,651 | 4/1990 | Lusignan | 370/69.1 |
| 4,939,790 | 7/1990 | Sgrignoli | 455/260 |
| 4,953,185 | 8/1990 | Goode | 375/106 |
| 4,979,230 | 12/1990 | Marz | 455/3 |
| 5,003,381 | 3/1991 | Berneking et al. | 343/700 MS |
| 5,020,076 | 5/1991 | Cahill et al. | 375/5 |
| 5,022,050 | 6/1991 | Tanaka | 375/7 |
| 5,023,562 | 6/1991 | Gumussoy | 329/303 |
| 5,043,738 | 8/1991 | Shapiro et al. | 343/700 MS |
| 5,045,816 | 9/1991 | Bramhall et al. | 332/105 |
| 5,053,717 | 10/1991 | Schulz et al. | 329/300 |
| 5,065,409 | 11/1991 | Hughes et al. | 375/91 |
| 5,091,921 | 2/1992 | Minami | 375/88 |

OTHER PUBLICATIONS

Databook Excerpt entitled "Patch or Microstrip Antennas", Subsection 16–12 of Section 16: *Antennas for special Applications: Feeding Considerations*, Date Unknown, pp. 745–749.

PCMICA Standards published by Personal Computer Memory card International Association, 1030 G. East Duane, Sunnyvale, CA 94086. Release2. and dated Nov. 1992.

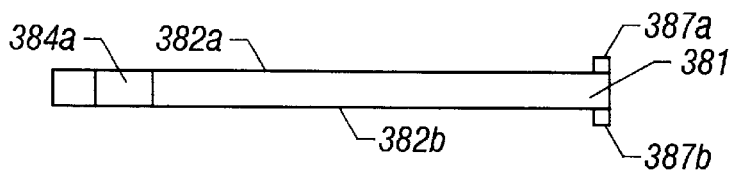
FIG. 3C-1
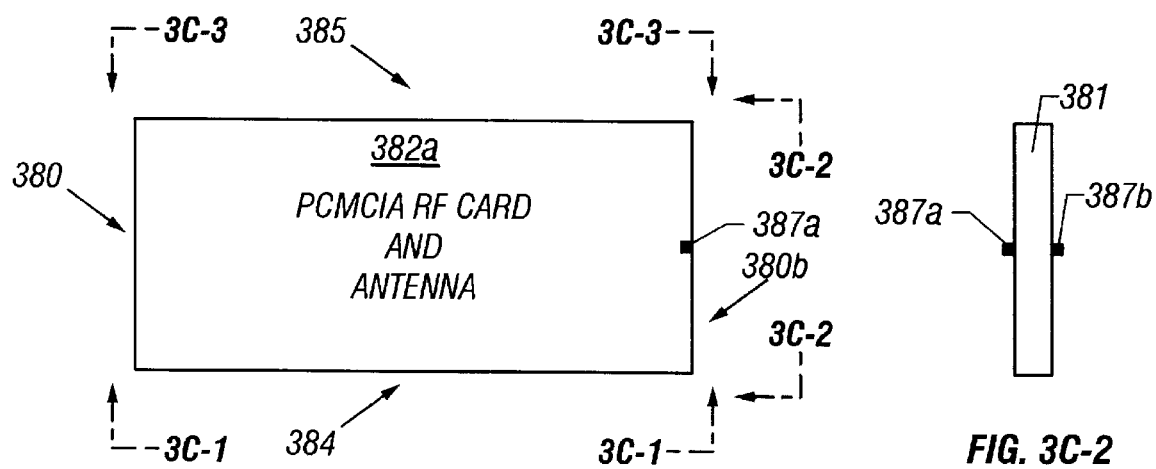
FIG. 3C-4
FIG. 3C-2
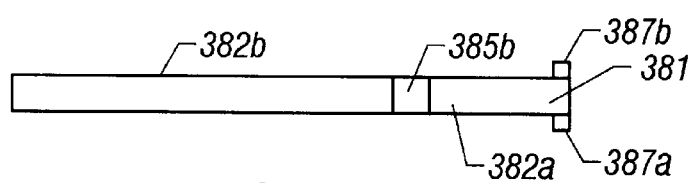
FIG. 3C-3

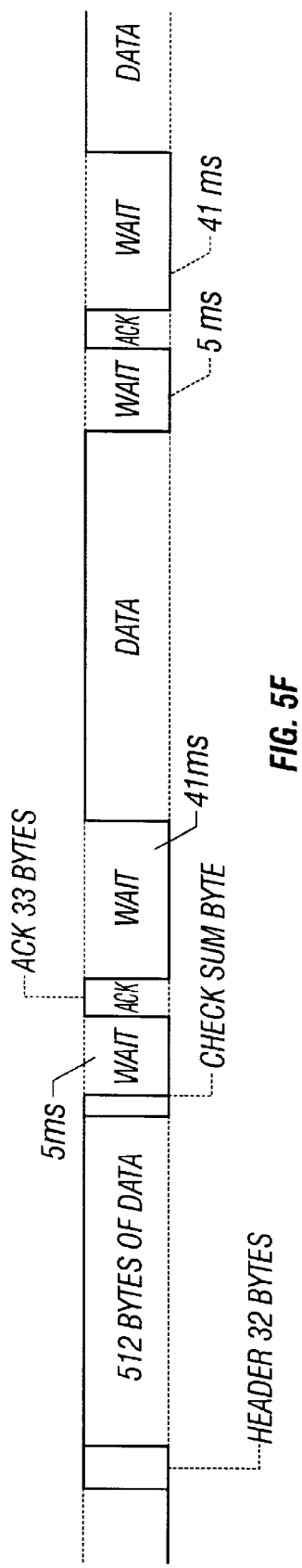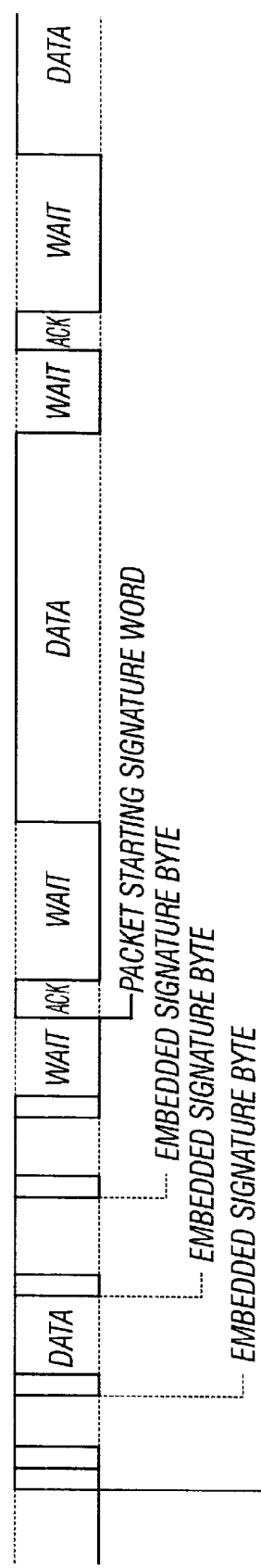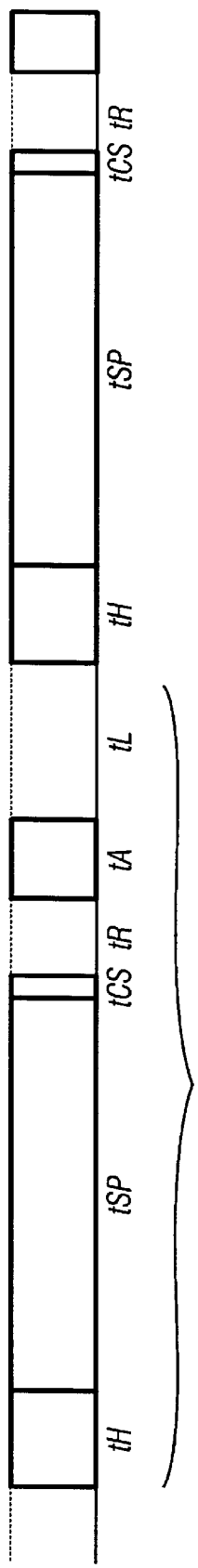
FIG. 5F
FIG. 5G
FIG. 5H

RADIO TRANCEIVER FOR DATA COMMUNICATIONS

RELATED APPLICATION

This application is a continuation application from U.S. patent application Ser. No. 08/425,635, which was filed on Apr. 20, 1995.

FIELD OF THE INVENTION

This invention relates to a radio frequency (RF) transceiver for data communication. More particularly, this invention relates to a compact RF transceiver with a built-in antenna for wireless communication between a computer and another device.

BACKGROUND OF THE INVENTION

Most conventional compact radio frequency (RF) transceivers are currently built using a plurality of printed circuit boards (PCBs), one for RF circuitry, and another for digital circuitry. In addition, conventional antennae and RF components which are generally physically larger than digital circuitry components do not fit within compact form factor housings for the following reasons.

Although mechanical tuning devices of the older generation transceivers have been eliminated by use of direct conversion (homodyne) receivers with voltage tuned components, together with improvements in digital frequency control such as voltage control oscillators with phase lock loop (PLL) circuits and digitally controlled divider circuits, conventional RF transceivers still include RF components which are too large for incorporation into the newer and more compact form factor housings required by the portable PC environment, such as the PCMCIA form factor. The physical and electrical PCMCIA standards are found in the PCMCIA Standards published by Personal Computer Memory Card International Association, 1030 G. East Duane, Sunnyvale, Calif. 94086. The current version is denominated Release 2, and dated November, 1992. This publication is incorporated herein in its entirety by reference. In addition, most commercially available conventional inexpensive demodulators for use in RF circuits have limited noise immunity. Alternatively, sophisticated demodulators are either too expensive or too bulky for use in the thin form factors required for small portable PC applications.

Small antennas are available for compact RF transceivers, and some smaller antennas have been designed to fit on small PCBs. However, these conventional small antennas are usually not omni-directional, have low radiation efficiency, have poor matching characteristics or have driving impedances that are too sensitive to nearby conducting surfaces, commonly encountered in the PC work environment.

The PC work environment generally comprises multiple PCs and peripherals. As such, it is necessary for an RF transceiver to avoid interfering with another transmission already in progress. If several transceivers are contending for the same channel, the channel is effectively blocked if these transmitters do not have some means of sharing the channel or resolving the contention.

Several conventional interference avoidance techniques have proven to be inadequate. One conventional interference avoidance method uses a carrier detect (CD) system to determine if a channel is occupied. In such a system, the carrier detect circuit causes the transceiver to wait for a clear channel before transmitting. However, in an environment where the allocated frequency range is very narrow, an out-of-band signal or a high noise level environment can easily cause a false "channel-busy" warning from the carrier detector circuitry, thereby preventing operation over an otherwise available channel. This is particularly true in the Industrial, Scientific and Medical (ISM) band where a large number of users employ different types of transmission formats and/or protocols and share the transmission frequency band for unrelated operations. Within the ISM band, there are no defined channels or bandwidth, and no protected channels.

The carrier detection interference avoidance technique is further complicated by the presence of other receiver(s) in the area since their local oscillator (LO) radiations may appear to be carrier signals to the carrier detect circuit. This problem is worse for direct conversion radios where the LO is on the same frequency as the receiver. In addition, other unrelated signals and noise may appear to be traffic on the network. This is because the RF input stage of a conventional direct conversion receiver has a broad bandwidth and therefore any nearby signal source is erroneously interpreted as traffic on the network.

Another conventional interference avoidance technique involves the use of communication command sets which include the attention (AT) command set, which has become the de facto standard (originally specified by Hayes Corporation for "smart modems"). The AT commands were designed to be operated using wired modems and these command sets are not always compatible with the typical operation of RF transceivers which have different contention and hand-shaking problems and hence requirements.

Power consumption is also another major concern in portable transceivers. Most commercially available portable radio transceivers, such as cellular phones, transmit in the 1–3 watt ranges. As such, it is not possible to run such transceivers for an extended period (days) using a small battery, for example, a disposable 9 volt battery or a small number of AAA batteries, commonly used to power the newer generations of palm top PCs. Instead, most conventional portable transceivers require larger Ni-Cad batteries which typically operate for at most 8 hours before requiring a recharge. As such, most conventional RF transceiver designs are unsuitable for incorporation in low power portable computers such as a lap-top or palm-top personal computer (PC).

Sleep modes or low power modes have been implemented in portable RF receivers to extend battery life. These modes must not cause missed messages or impose excessive delay in receiving messages. Conventional methods include using: (a) a low power broad band receiver which remains powered to wake up the main sleeping receiver; or (b) waking a sleeping receiver periodically on a predetermined schedule to listen for expected transmissions. Both of these methods have inherent disadvantages.

A low power broad band receiver will interpret noise or transmissions in a neighboring frequency as a message which should be received and wake the main receiver unnecessarily, thereby wasting power. Alternatively, a timed wake-up type receiver must be synchronized by a central control means and is therefore generally not suitable for random transmissions between independent terminals such as PCs and peripherals.

Yet another conventional method of conserving power involves shutting clocks down and restarting the clocks when needed. However, restarting the clocks and allowing the clock oscillations to stabilize sufficiently before resuming operation of the receiver imposes an undesirable delay in recovery time.

Accordingly, there is a need for a compact, low cost and low power RF transceiver having an efficient contention resolution capability that fits into a housing sized within a compact form factor, for use with PCs and/or peripherals.

SUMMARY OF THE INVENTION

In accordance to the invention, prior art difficulties arising from the inability to package low-power digital and analog circuitry and a RF antenna in a small compact package, such as a PCMCIA-sized package, are overcome by providing a direct conversion or zero IF transceiver having a voltage controlled oscillator (VCO), a quadrature detector, and a compact antenna. The direct conversion receiver circuit and quadrature detector are critical in achieving both low power consumption and good noise rejection and small form factor. In the quadrature detector, out of band signal rejection is achieved in the trigometric function of the demodulator, implemented in silicon, whereas in hetrodyne circuits rejection is achieved with bulky mechanical or crystal filters. Low power consumption is achieved by using a digital quadrature detector to detect FSK modulation. This allows the use of low current non-linear I and Q amplifiers instead of more expensive linear amplifiers.

In addition, the low power transceiver has a sleep mode capability to further minimize power consumption. In one embodiment, there are at least two analog switches in series isolating the local oscillator (LO) signal provided by the VCO from the antenna when the transceiver is in the receive mode, thereby significantly reducing the effect of any noise generated by the LO on the receiver, and minimizing LO radiation from the antenna.

The compact antenna, e.g. a patch antenna, can form an integral part of an outer shell or enclosure of the transceiver package. In some embodiments, the outer shell is a metal casting. Alternatively, the shell can be stamped from a metal sheet. The shell or enclosure can also be filled with a dielectric material.

Fine tuning can be accomplished by adding a tuning clip on the external enclosure for adjusting the resonant frequency response of the antenna.

In some embodiments, a signature detector enables the transceiver to distinguish between noise or interference and valid messages by recognizing a signature word embedded in the data packet.

BRIEF DESCRIPTION OF THE DRAWINGS

FIG. 3A1 is a view taken along the lines of 3A1—3A1 of FIG. 3A.

FIG. 3B1 is a view taken along the lines 3B1—3B1 of FIG. 3B.

FIG. 3C4 shows a top plan view of one implementation of the antenna.

FIG. 3C1 is a view taken along the lines 3C1—3C1 of FIG. 3C4.

FIG. 3C2 is a view taken along the lines 3C2—3C2 of FIG. 3C4.

FIG. 3C3 is a view taken along the lines 3C3—3C3 of FIG. 3C4.

FIGS. 5F, 5G and 5H illustrate a typical stream of data packets.

DETAILED DESCRIPTION OF THE INVENTION

Figure 1:
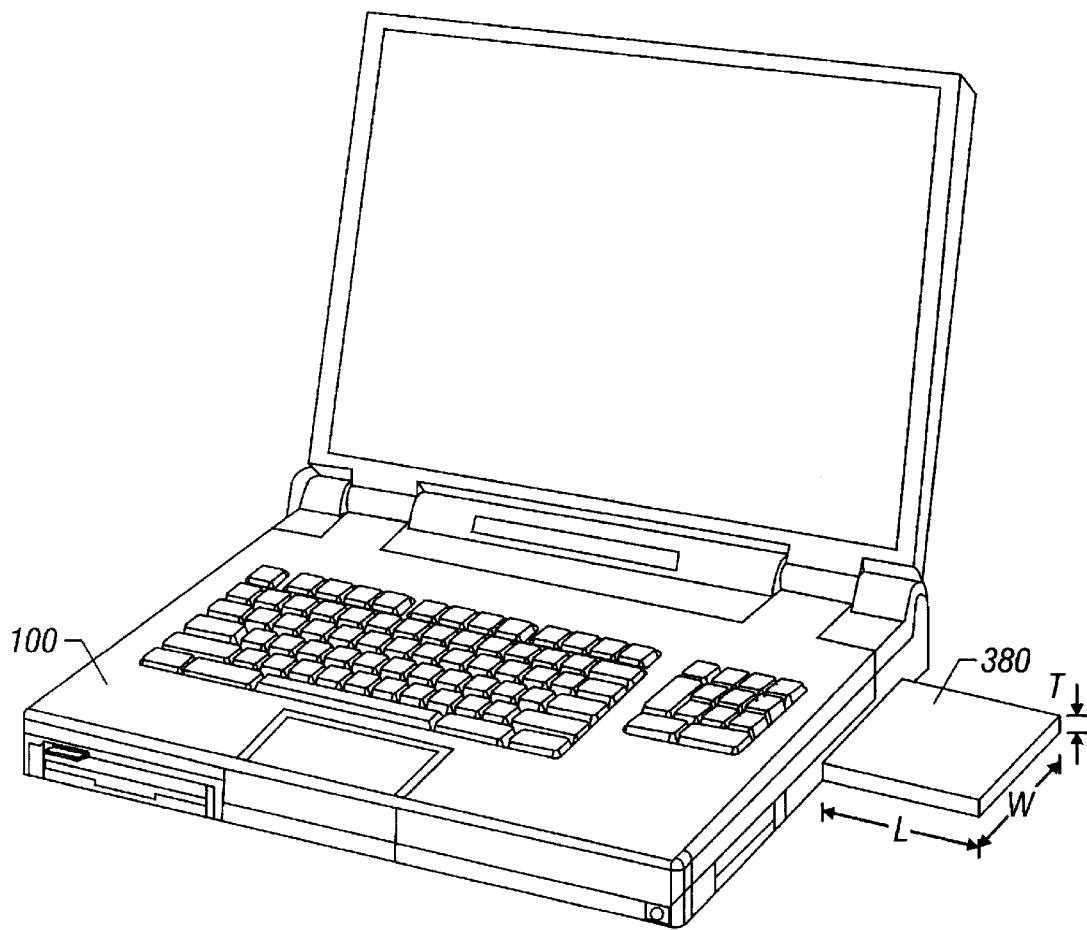
FIG. 1 is a perspective view of a host computer coupled to a compact transceiver in accordance with the invention.

FIG. 1 is a perspective view of host computer 100 coupled to a compact RF transceiver 150 in accordance with the invention. The transceiver 150 is shown partly inserted into the PCMCIA slot of computer 100. When plugged in for operation there is only a very small part of the card protruding from the side of the computer. The width of transceiver package 150 indicated by W in FIG. 1 is 2.126 inches in the type I and type II formats of the PCMCIA standard. Length L according to the current standard is 3.370 inches. Depending on the slot in the computer, the thickness of the card (indicated by T) may be 3 millimeters or 5 millimeters for the Type 1 and Type 2 cards, respectively. A connector is included along the end of the card which is partially inserted into host computer 100 and is not shown in this figure. The connector location in pin numbers 4, the cards are specified in the PCMCIA standards and therefore will not be specifically addressed here.

In one embodiment, transceiver 150 is disposed within a PCMCIA format package described above, with an antenna, RF and digital circuitry integrated on a single printed circuit board (PCB) disposed within the PCMCIA package. In other embodiments, the antenna may be disposed outside the PCMCIA package in order to overcome any inherent RF shielding caused by the host computer housing or other considerations. Although the transceiver at present invention is well suited to implementation in the PCMCIA formats, the transceiver is not limited to use only in that environment.

Figure 2A:
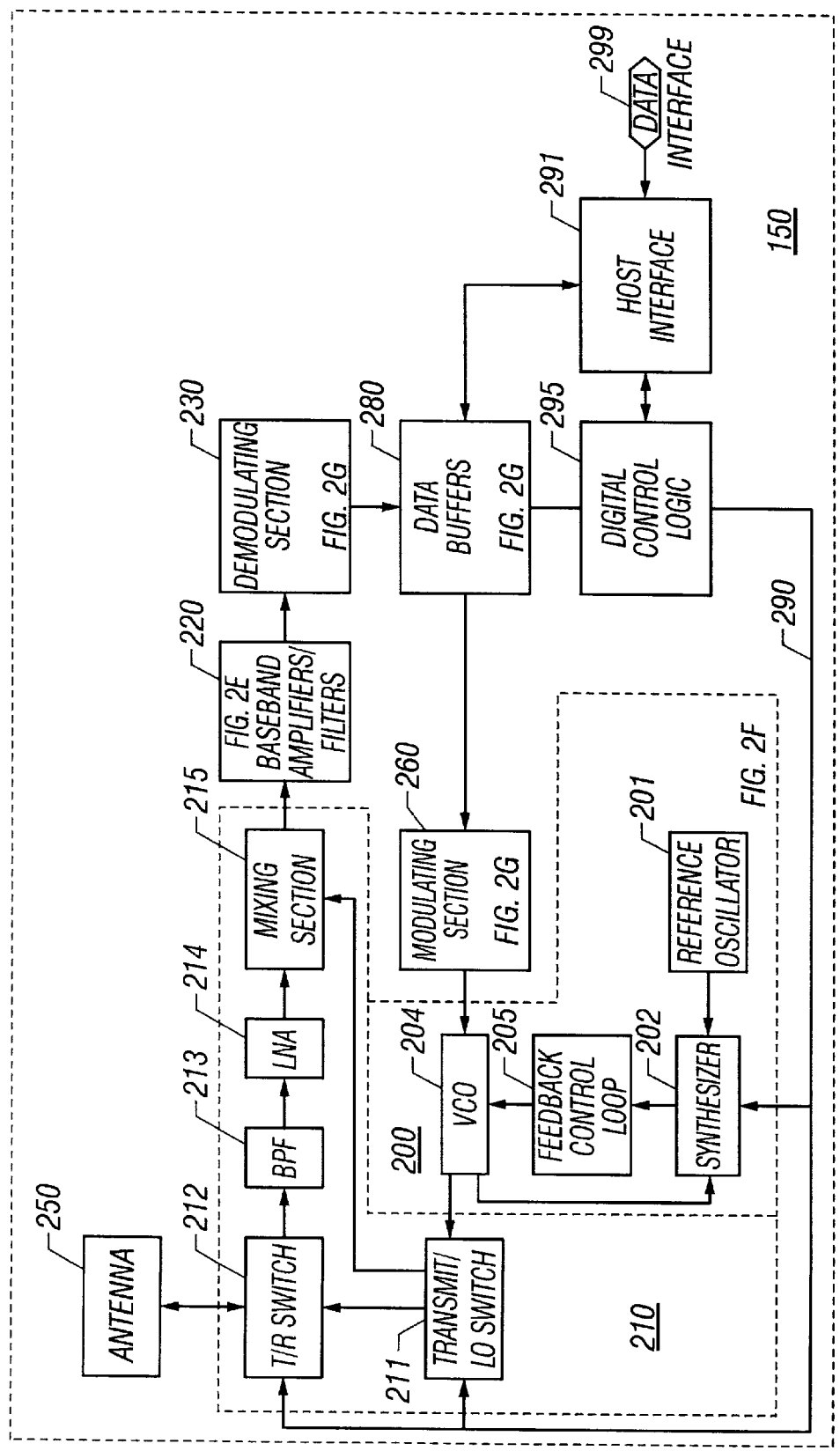
FIG. 2A shows a simplified block diagram of the transceiver.

FIG. 2A shows a simplified block diagram of transceiver 150. Transceiver 150 comprises an oscillator section 200 (indicated within dashed lines), a switching and mixing section 210 (also indicated within dashed lines), baseband amplifiers/filters 220, antenna 250, a demodulating section 230, a modulating section 260, data buffers 280 and host interface 291 connected to data interface bus 299. In addition, a digital control logic section 295 provides digital control for transceiver 150. The receiving and transmitting portions of transceiver 150 share the same oscillator section 200 which comprises a reference oscillator 201 coupled to a synthesizer 202 driving a voltage-controlled oscillator (VCO) 204 via a feedback control loop 205.

During a transmit mode, digital data to be transmitted is loaded into data buffers 280 via data interface bus 299 and host interface 291. The data is then processed by modulating section 260 and fed into VCO 204 where it frequency modulates the transmit signal. The signal from the VCO is fed back to synthesizer 202 to lock VCO 204 to reference oscillator 201. The modulated signal from VCO 204 is then routed via switches 211, 212 and transmitted via antenna 250.

In a receive mode, switch 212 routes the signal received via antenna 250 through a broad band filter 213 to the input of low noise amplifier (LNA) 214 for amplification before being applied to the mixing section 215. VCO oscillator 204 provides a local oscillator (LO) signal via switch 211 to mixing section 215. The amplified received signal and the LO signals are combined in mixing section 215 and their differential signal is amplified in the baseband amplifiers/filters 220. The amplified logic level signals from baseband amplifiers/filters 220 are demodulated in demodulating section 230 and the resulting stream of data bytes are stored in data buffers 280 prior to their transfer by host interface 291 and data interface bus 299 to the host computer 100.

A pair of switches, T/R switch 212 and transmit/LO switch 211, provide a means for selectively coupling antenna 250 to either the receiver portion or the transmitter portion of transceiver 150. In some embodiments, in order to conserve power and to minimize the total number of components in transceiver 150, receiver and transmitter portions share common components.

Figure 2B:
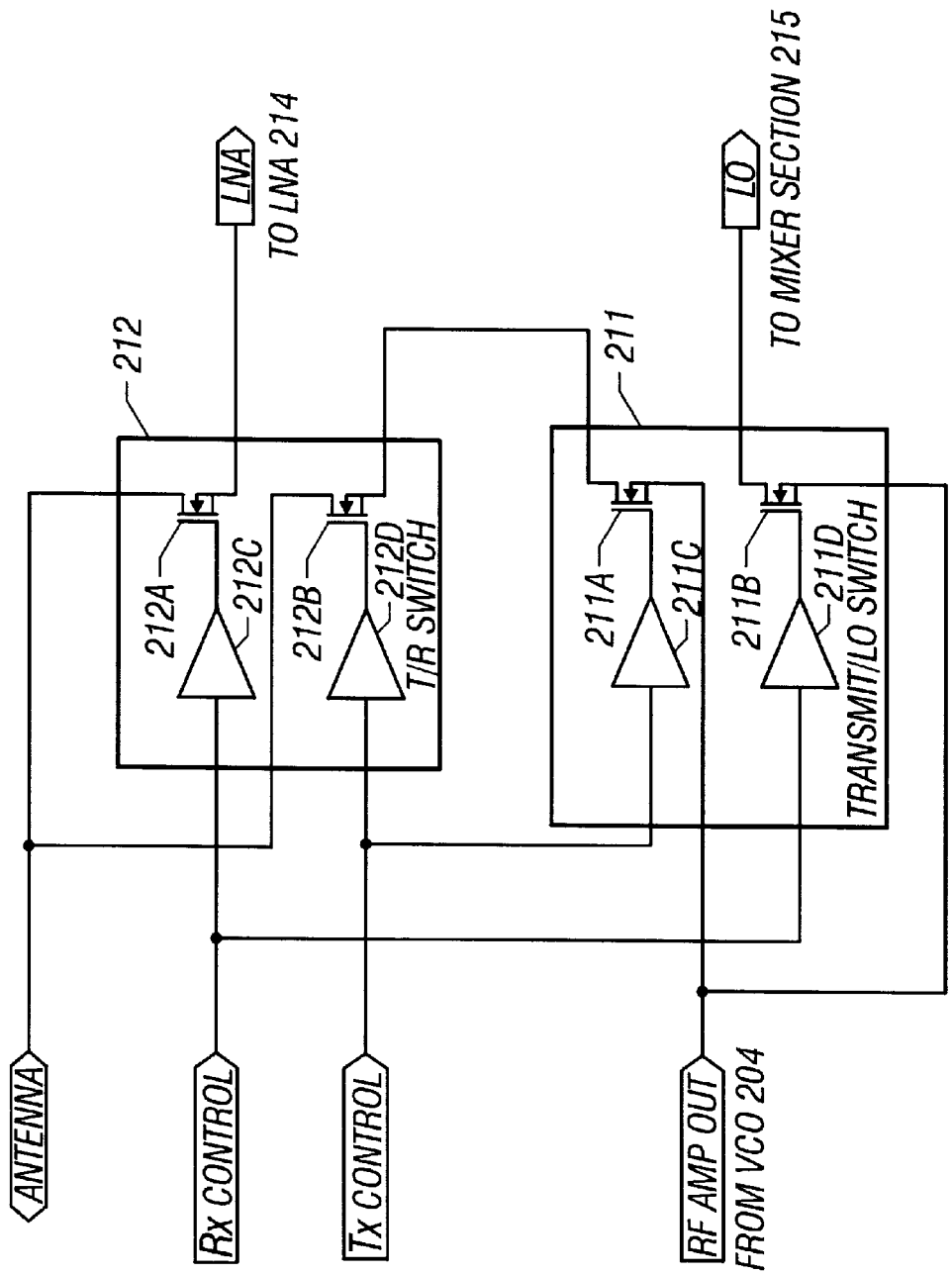
FIG. 2B shows a pair of analog switches for isolating the oscillator from the antenna during the receive mode.

FIG. 2B shows transmit/LO switch 211 and T/R switch 212 in greater detail. Each of these switches comprises two bidirectional analog switches indicated 212A and 212B in T/R switch 212, and indicated 211A and 211B in transmit/LO switch 211. Devices 212A, 212B, 211A and 211B may be implemented with standard MOSFET integrated circuit devices. Additionally, T/R switch 212 includes first and second inverters, 212C and 212D respectively. Similarly, transmit/LO switch 211 includes inverters 211C and 211D. Control signals from digital control logic 295 are provided to T/R switch 212 and transmit/LO switch 211 over control bus 290. Digital control signals designated Rx control and Tx control are provided to input nodes of switches 211 and 212.

Figures 1, 2C:
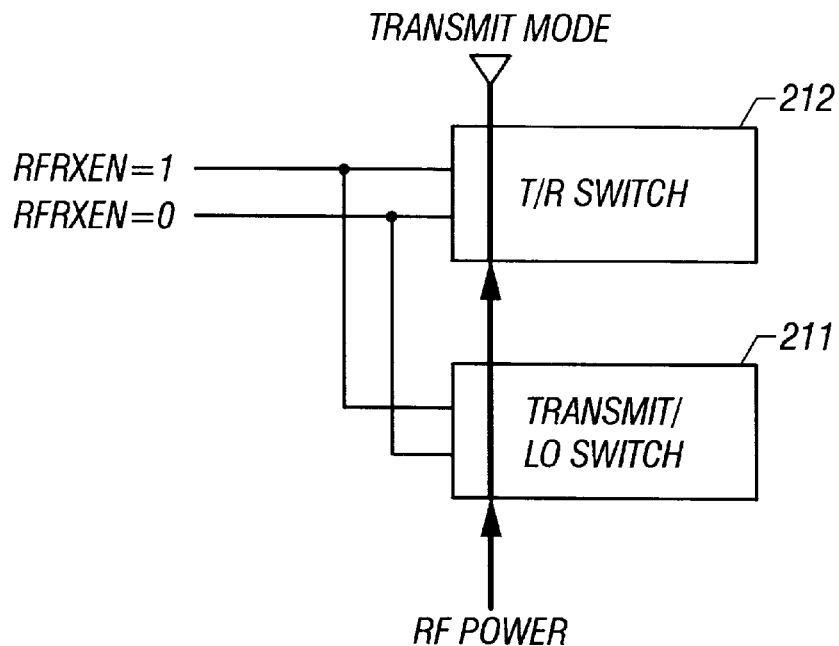
FIG. 2C shows the respective transmit and receive signal paths of the isolation switches shown in FIG. 2B.

FIG. 2C shows the respective transmit and receive mode signal paths of switches 211, 212. In the receive mode, switches 211 and 212 provides isolation between oscillator section 200 and antenna 250 by attenuating the local oscillator signals with two open switches in series. In addition, switches 211 and 212 also minimize the effect of signal LO present at the input of a low noise amplifier (LNA) 214 which would otherwise desensitize the receiver portion of transceiver 150. Conversely, in the transmit mode, switch 212 also prevents the transmit signal from overloading the sensitive receiver amplifier inputs of transceiver 150.

Figures 2, 2C:
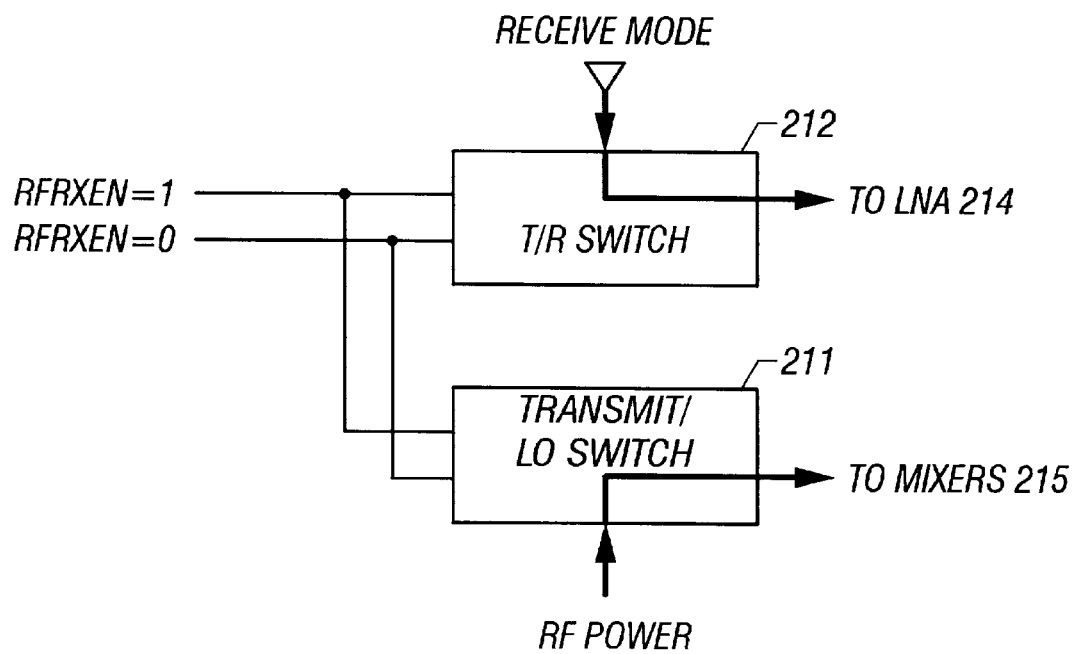
Figure 2D:
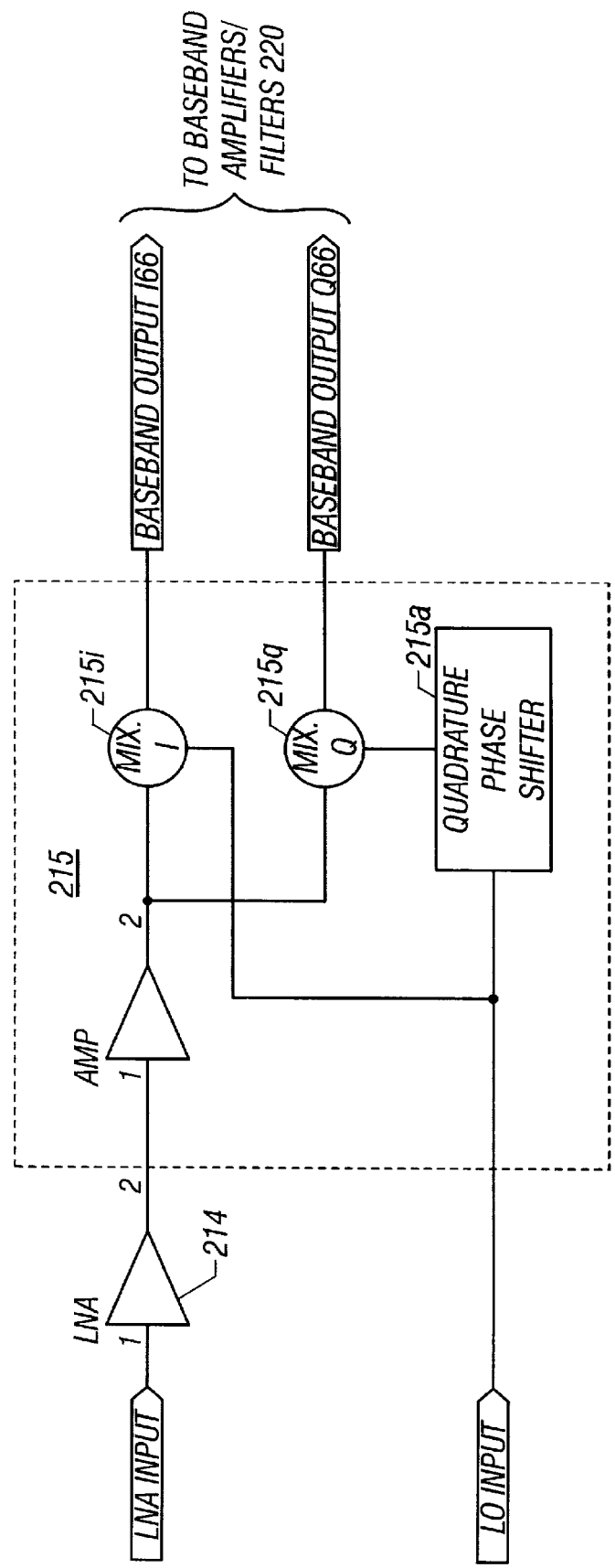
FIG. 2D shows a detailed block diagram of a low noise amplifier and a mixing section used in the transceiver of FIG. 2A.

FIG. 2D shows a detailed block diagram of LNA 214 and mixing section 215. LNA 214 is designed to have a low noise figure (F1) and high gain (A1) to overcome the inherently higher noise figure of the second amplifier 215b and the mixers 215i and 215q. Noise figure is defined by the formula:

$$Ftotal = F1 + (F2-1)/A1 + (Fmixer-1)/A1A2$$

where

F1 is the noise figure of LNA 214

A1 is the gain of LNA 214

F2 is the noise figure of amplifier 215b

A2 is the gain of amplifier 215b

Fmixer is the noise figure of either mixer, 215i or 215q.

A broad band filter 213 (FIG. 2A) coupled between T/R switch 212 and LNA 214 provides some discrimination against strong signals outside the frequency band of interest with low insertion loss within the band, as an example the band between 902 and 928 MHz. Such a broad band filter can be implemented by selecting appropriate values of fixed passive components so that no tuning is required. Standard passive filter design may be used for the selection of the components.

I and Q mixers 215$i$ and 215$q$, respectively, of mixing section 215 combine LO signal from switch 211 and the output signal of LNA 214 as amplified by amplifier 215$b$, producing the respective base band signals $I_{bb}$ and $Q_{bb}$. A quadrature phase shifter 215$a$ provides the 90 degree phase relationship between the two LO inputs to the two mixers. The output difference signals maintain this 90 degree phase relationship so there are two baseband signals differing only by their phase. As the received signal is shifted in frequency above and below the LO frequency the order of this 90 degree phase shift will reverse between the two signals $I_{bb}$ and $Q_{bb}$. Mixers 215$i$ and 215$q$ are double balanced so they balance out the LO signals, and the input signal from the LNA, at the output of each mixer. This leaves the sum and difference signals (plus leakage at the original frequencies). All frequencies except the difference (baseband) signal are attenuated by low pass filters 211$i$ and 211$q$ in the baseband amplifiers/filters section 220 and by the losses in the amplifiers at those high frequencies.

Figure 2E:
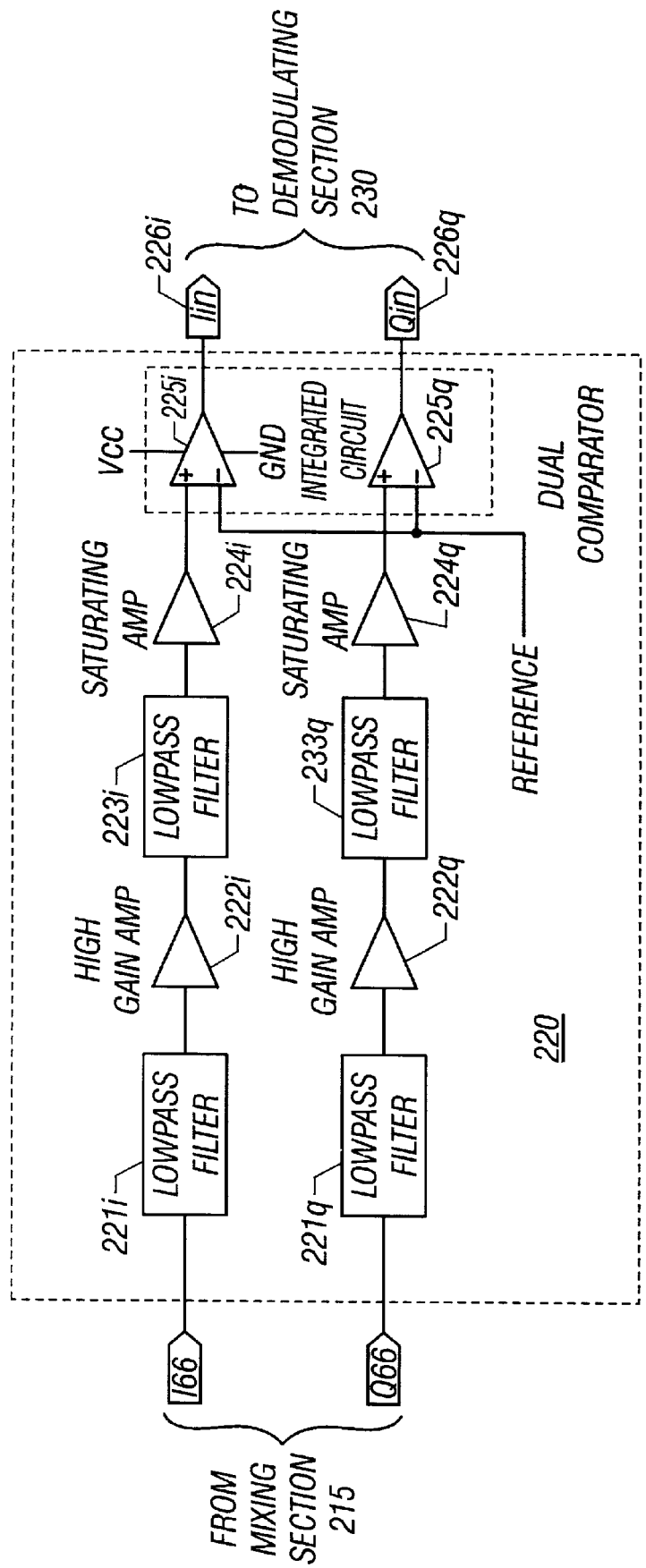
FIG. 2E shows the parallel $I_{bb}$ and $Q_{bb}$ processing paths formed by a set of amplifiers/filter sections.

Referring now to FIG. 2E, the output signals of mixers 215$i$ and 215$q$, i.e. $I_{bb}$ and $Q_{bb}$, are processed separately by baseband amplifiers/filters section 220. First signals $I_{bb}$ and $Q_{bb}$ are filtered by low pass filters 221$i$ and 221$q$, then amplified by high gain amplifiers 222$i$, 222$q$. The resulting signals are filtered by low pass filters 223$i$, 223$q$, amplified by saturating amplifiers 224$i$, 224$q$, before being compared with the saturation amplifier's center reference level in comparators 225$i$, 225$q$, respectively. Low pass filters 223$i$ and 223$q$ serve to remove the summing frequency and harmonics of signals $I_{bb}$ and $Q_{bb}$, while saturating amplifiers 224$i$ and 224$q$ serve to remove all amplitude variations, leaving only the phase information in the zero crossing of the respective fully saturated output signals from amplifiers 224$i$ and 224$q$. Finally, comparators 225$i$ and 225$q$ convert the output signals of amplifiers 224$i$ and 224$q$ into a pair of logic level signals Iin and Qin which are provided at leads 226$i$ and 226$q$, respectively, as outputs indicated logic level I and logic level Q, respectively. The direct conversion receiver circuit is critical in reducing the size of the I and Q channel filters in FIG. 2E. In the prior art, small, low cost receivers use a hetrodyne receiver circuit. The selectivity requirements of the IF filters used in a hetrodyne circuit are greater by the same amount that the IF frequency is greater than the demodulator center frequency. In the direct conversion circuit, the IF frequency is the same as the demodulator center frequency. This reduces the filter selectivity requirements, permitting the use of smaller filters. In one implementation, the IF and demodulator frequency is zero thus allowing for the use of lowpass IF filters, further reducing filter size.

Figure 2F:
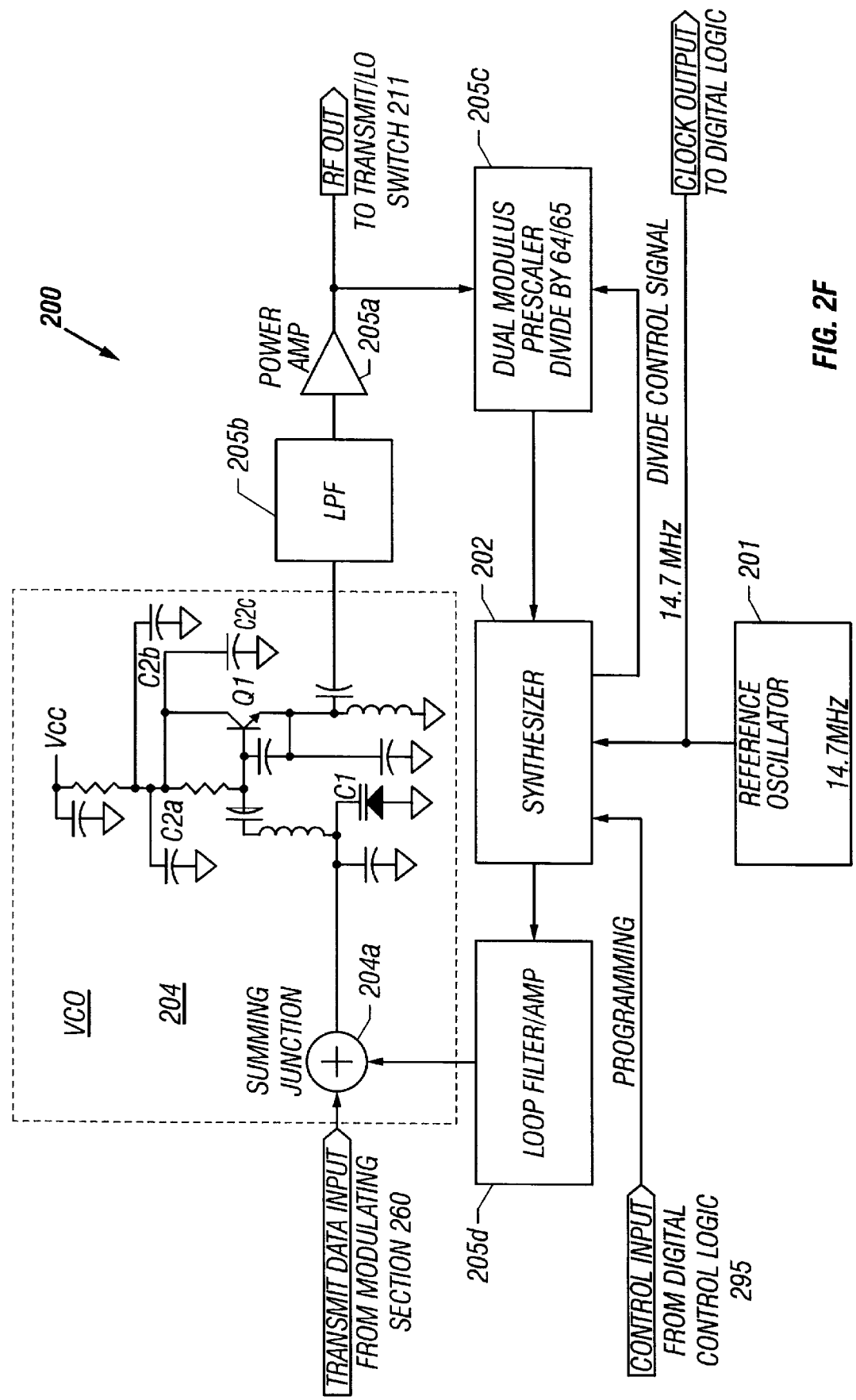
FIG. 2F shows in block diagram form oscillator section 200 and in detail portions of the VCO used in the transceiver.

Referring back to FIG. 2A, the receiving and transmitting portions of transceiver 150 share the same frequency synthesizer 202 and voltage controlled oscillator 204. One such frequency synthesizer 202 is illustrated in FIG. 2F. In order to minimize power consumption during the power down mode, i.e. during sleep mode, frequency synthesizer 202 is allowed to drift to the center of the frequency band. The power down sleep mode is discussed in greater detail below.

Voltage-controlled oscillator (VCO) 204, which is coupled to synthesizer 202 via feedback control loop circuit 205, oscillates at the transmitter frequency. When synthesizer 202 is powered down, i.e. during a sleep period, VCO 204 continues to oscillate within a frequency band determined by a fixed resistor divider of summing junction 204$a$ (illustrated in FIG. 6A) which provides a constant standby control voltage. Such an arrangement, i.e., the fixed resistor divider, allows synthesizer 202 to minimize its frequency lock-on and settling time upon powering on, i.e. awaken.

Reference oscillator 201 also remains powered when synthesizer 202 is powered down during the sleep mode. By remaining on, the reference oscillator is able to maintain a stable frequency and is immediately available when receiver operation is resumed. Since a stable frequency is maintained, reference oscillator 201 is able to provide clock signals for the digital circuits which remain powered when transceiver 150 is in the sleep mode. Oscillator section 200 operates over the full 902 to 928 MHz band by digital programming of the divider chains within the frequency synthesizer 202.

Feedback control loop circuit 205 comprises power amplifier 205$a$, low pass filter (LPF) 205$b$, prescaler 205$c$ and a loop filter/amplifier 205$d$. First, the output signal from VCO 204 is processed by low pass filter 205$b$ to attenuate harmonics as required for FCC compliance, before being amplified by power amplifier 205$a$, which includes isolation and pads (not shown). The output signal from power amplifier 205$a$ is then fed into dual modulus prescaler 205$c$ which divides, e.g. by 64 or 65, under the control of synthesizer 202 via a divider control signal.

All synthesizer tuning is provided by programmable, integrated circuit synthesizer 202. Synthesizer 202 comprises frequency dividers, phase detector and control circuitry for controlling the dividers inside the integrated circuit and dual modulus divider prescaler 205$c$. Synthesizer 202 processes the signals being applied to its internal digital phase detector from the internal dividers, which in turn outputs charge pump pulses, whose duty cycle is dependent on the relative phase of the two inputs, one from the reference divider and the other from dividers following the prescaler. This variable duty cycle pulse train of charge pump pulses is used to charge the feedback loop filter capacitance to provide a control voltage for loop feed-back to the VCO. The charge pump pulses are provided as an output from synthesizer 202 and are applied to loop filter/amplifier (AMP/LPF) 205$d$ thereby providing a voltage control signal into summing junction 204$a$. The output signal from summing junction 204$a$ is provided to a variable capacitor (varicap) WVC1 of VCO 204. The closed loop feedback control technique described above enables synthesizer 202 via the coupling VCO 204 to lock onto a programmed channel/frequency. A serial (data) signal from modulating section 260 (FIG. 2A) modulates the output signal of VCO 204 by controlling summing junction 204$a$ which in turn is coupled to voltage variable capacitor WVC1. In this embodiment, LPF 205$b$ is implemented with components having fixed values of inductance and capacitance which may be calculated using standard formulas known to those skilled in the art and available in literature. Similarly, AMP/LPF 205$d$, a loop filter comprises components having fixed values of resistance and capacitance. The values of components for both filters can be derived from established filter design formulas.

The modulation signal from modulating section 260 is applied to summing junction 204$a$ (FIG. 6A) and the summed signal, fed into varicap VVC1, shifts the VCO frequency 300 KHz below or above the central frequency, depending on whether the incoming data bit provided from modulating section 260 to summing junction 204$a$ is a "1" or a "0". Using, for example, Manchester coding, the frequency spectrum of the incoming data stream is maintained above the bandpass frequency of loop filter/amplifier 205$d$ so that the average value of the control loop voltage remains constant, thereby enabling feedback control loop circuit 205, described above, to remain in lock. Alternatively, a conventional universal asynchronous receiver transmitter (UART) may be used in a simpler modulation/demodulation embodiment. This may be achieved, for example, by applying the incoming data stream to a modulator circuit, including a variable voltage capacitor (VVC) in reference oscillator 201 to shift its frequency in the same direction as the 300 KHz deviation of VCO 204 in the above-described technique so that the effect of the frequency shift is cancelled at the feedback loop phase detector. This allows modulation within the loop bandpass without disturbing the lock. By carefully balancing the frequency shifts at the two oscillators (reference oscillator 201 and VCO 204) it is possible to avoid signal changes through the loop filter 205*d* that would change the average center frequency. This is necessary because the UART has frequency components within the loop passband.

Figure 2G:
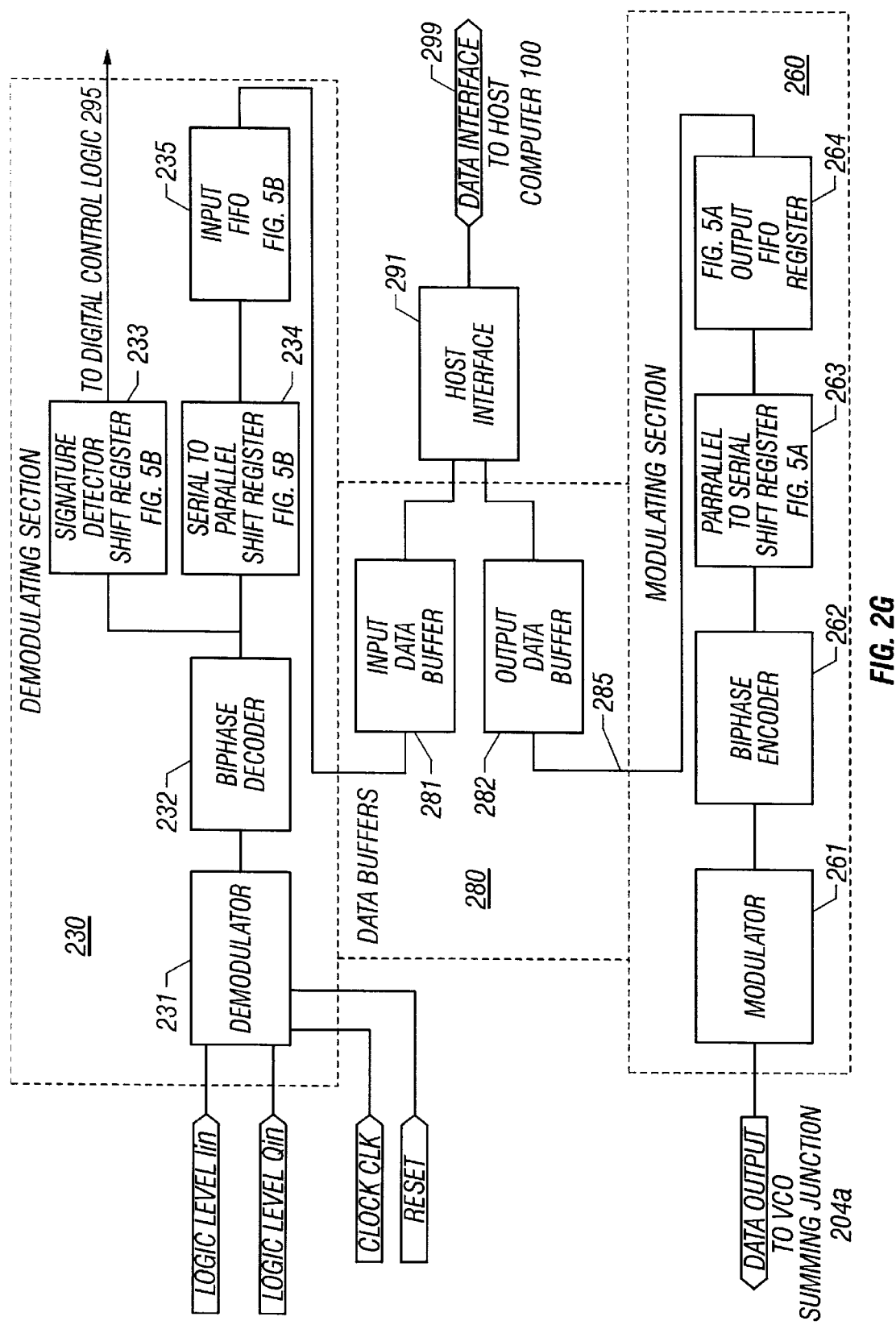
FIG. 2G shows a detailed block diagram of the demodulating section 230, modulating section 260, and data buffers 280 used in the transceiver of FIG. 2A.

FIG. 2G shows a detailed block diagram of demodulating section 230, modulating section 260, and data buffers 280, and host interface 291 are also shown. Logic level output signals Iin and Qin from baseband/amplifilters 220 are demodulated by an asynchronous state machine of demodulator 231 and decoded with a suitable decoding scheme (such as Manchester decoding) by biphase decoder 232.

In the UART embodiment, the output of asynchronous demodulator 231 is coupled to a conventional UART for converting the serial bits into bytes. Hence, depending on the particular implementation of transceiver 150, any one of a number of modulation/demodulation schemes can be used.

As discussed above, logic level signals Iin and Qin are applied to the state machine of demodulator 231. The output node of demodulator 231 is coupled to a (Manchester) biphase decoder 232. Decoder 232 derives a clock signal from the incoming signal from demodulator 231 and produces a serial data bit stream comprising data, embedded signatures, headers and error detection bytes. The decoded serial data stream from biphase decoder 232 is then fed simultaneously into signature detector shift register 233 and serial to parallel shift register 234. Shift register 233 detects any embedded signatures and outputs control signals to digital control logic 295 of transceiver 150 indicating whether a valid data bit stream has been received. A valid bit stream always begins with two signature words received consecutively. If the data bit stream is valid, shift register 234 begins conversion of the serial data bit stream into data bytes. These bytes of data are then loaded into input first-in, first-out (FIFO) register 235 which temporarily holds several bytes of data before transfer to input data buffer 281. Subsequently, the data bytes stored in input data buffer 281 are transferred to host computer 100 via host interface 291 and data interface bus 299 under the direct control of host computer 100.

Conversely, during data transmission from host computer to transceiver 150 for transmission to a receiver, bytes of digital data are loaded into output data buffer 282 via data interface bus 299 and host interface 291 under the control of host computer 100. Internal logic also initiates the next phase of the transmission by causing the data stored in output data buffer 282 to be loaded into output FIFO register 264. The first outgoing data byte is loaded into parallel to serial shift register 263 from output FIFO register 264, followed by subsequent data bytes.

The resulting serial data bit stream is then fed into Manchester biphase encoder 262, processed by a modulator 261, and subsequently applied to summing junction 204*a* of VCO 204. The output data bit stream produced by modulator 261 shifts its instantaneous frequency above and below the central frequency by 300 KHz thereby providing the frequency shifting of the output signal of VCO 204 prior to transmission via antenna 250.

Figure 2H:
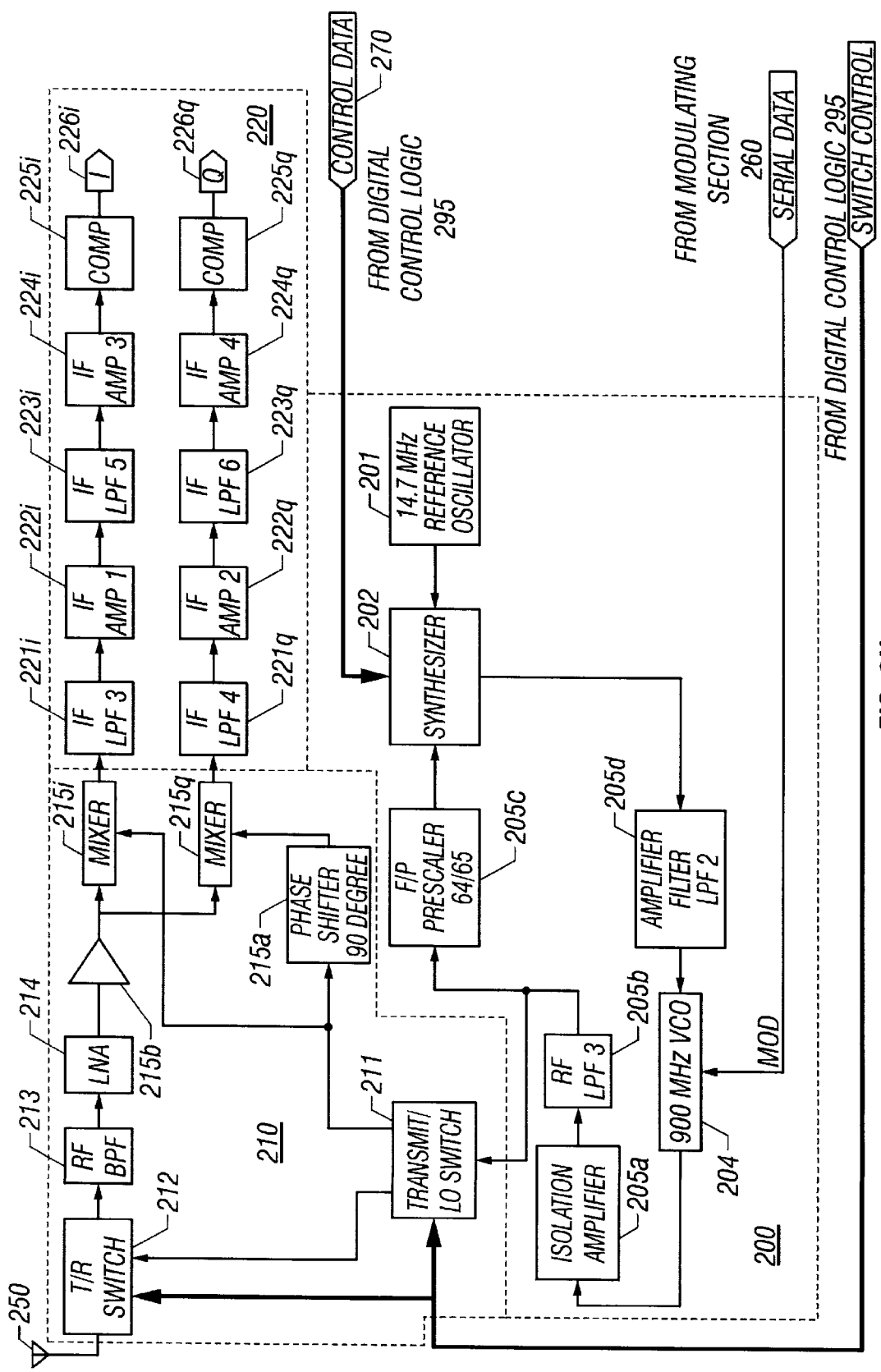
FIG. 2H shows a detailed block diagram of the analog portions 200 and 210 of the transceiver of FIG. 2A.

FIG. 2H shows a detailed block diagram of the analog portion of transceiver 150 described above, comprising oscillator section 200, switching and mixer section 210, and I/Q signal generating section 220 (digital control and host interface circuitry not shown).

In order to keep the physical size of transceiver 150 small, compact antenna 250 is disposed on a printed circuit board (PCB) together with the digital circuitry and RF components. In one embodiment, antenna 250 is a patch antenna with dimensions less than ½ wavelength of the center frequency of the band of interest. The exact dimensions depend on the frequency band of interest and the dielectric constant of the insulating substrate. Standard formulas may be used to determine the dimensions. A properly designed driving circuit allows efficient coupling of an electrically short antenna structure over the frequency band of interest. Antenna 250 is nearly omni-directional in the horizontal plane, is less sensitive to nearby conductive surfaces, and provides reasonable radiation efficiency for its small size. The associated matching system, designed by conventional formulas, provides effective power coupling between transceiver 150 and antenna 250.

Figure 3A:
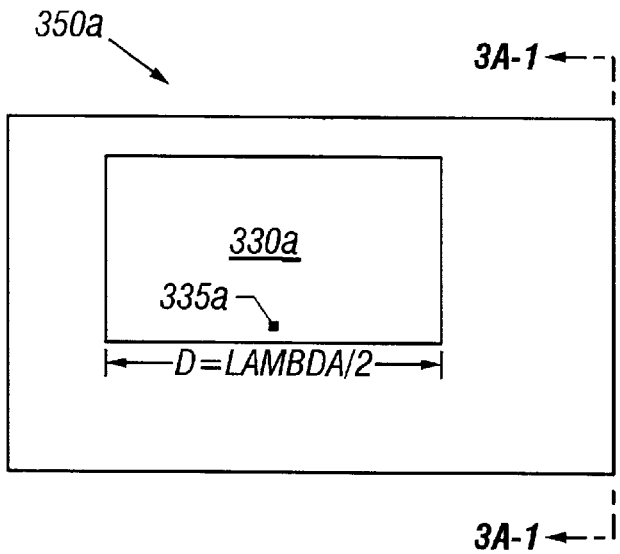
FIG. 3A shows a top view of a typical, prior art, patch antenna.
Figures 1, 3A:
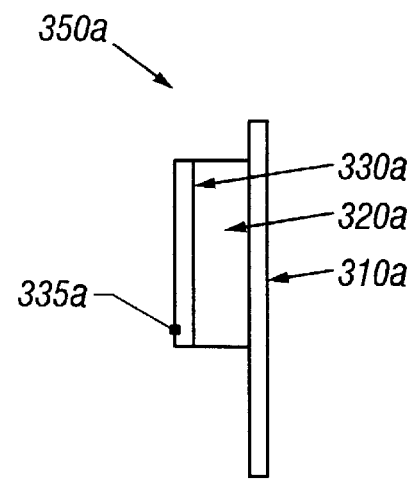

FIG. 3A is top view of a typical patch antenna 350*a*. FIG. 3A1 is a view taken along lines 3A1—3A1 of FIG. 3A. Transmitting/receiving patch 330*a* of antenna 350*a* is an electrically conductive plate having a first dimension D=½ wavelength. Patch 330*a* is mounted on a larger ground plane 310*a* (which is also an electrically conductive plate) separated by a dielectric layer 320*a*. Patch 330*a* is driven via drive point 335*a*. Antenna 350*a* functions as a set of slot 10 antennas around the periphery of patch 330*a* with fields that combine to launch plane waves parallel to ground plane 310*a*. The direction of the principal lobe of radiation is perpendicular to the plane of patch 330*a*, and radiates above ground plane 310*a*.

Figure 3B:
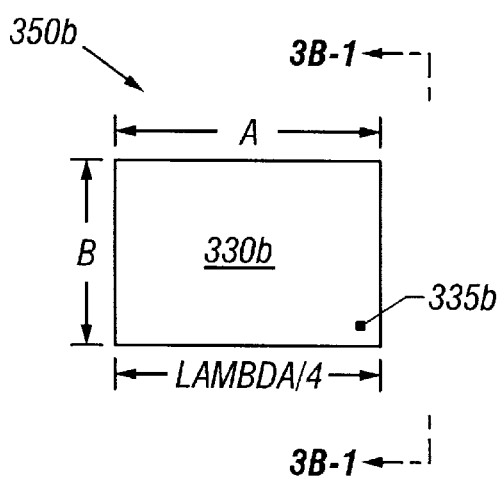
FIG. 3B is a top view of a patch antenna in accordance with the invention.
Figures 1, 3B:
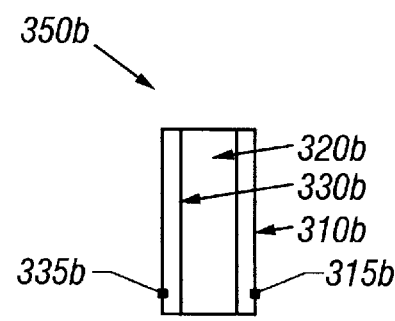

In accordance with one aspect of the invention, patch antenna 350*b* is provided, and is uniquely applicable for use in the transceiver 150 for antenna 250 which has heretofore been indicated by a block. Patch antenna 350*b* is illustrated in a top plan view in FIG. 3B and in a side view in FIG. 3B1, which is a view taken along lines 3B1—3B1 of FIG. 3B. Patch antenna 350*b* is comprised of patch 330*b* which is an electrically conductive plate, a ground plane 310*b* which is also an electrically conductive plate, separated by dielectric layer 320*b*. Patch antenna 350*b* is driven at one corner at connection point 335*b*. As will be appreciated by reference to FIGS. 3B and 3B1, ground plane 310*b* is the same size as patch 330*b*. Patch 330*b* and ground plane 310*b* may be constructed of, for example, copper or another material which is electrically conductive. Dielectric layer 320*b* may be, for example, epoxy or Teflon. Patch antenna 350*b* may be constructed as part of a printed circuit board, with the dielectric material of the printed circuit board serving as dielectric layer 320*b*. As illustrated in FIG. 3B, dimension A is selected to be ¼ wavelength long, based on the frequency of interest. Dimension B for antenna 350*b* may be equal to dimension A, in which case only one resonant frequency is available. However, if dimension A is not equal to dimension B, then two resonant frequencies are available for the antenna. As illustrated in FIG. 3B1, connection point 315*b* on ground plane 310B is located directly beneath connection point 335*b* on patch 330*b*. Although in the embodiment illustrated the electrical connections to the patch and the ground plane are positioned at one corner, other connection locations may be used provided that the top (335*b*) and bottom (315*b*) connection points are aligned. An advantage of providing the connection points in a corner is that this results in the minimum size for the antenna. Patch 330b and ground plane 310b may be constructed using the foil of a double sided printed circuit board. Antenna 350b resonates, using the sides of the rectangular patch as slots to provide 360° radiated pattern in the plane of the patch. A nearly square patch (or substantially square patch) will generate a radiation pattern in the plane of the patch that is nearly omni-directional. As discussed above, antenna 350b is integrated into the PCB, and is joined to the PCB by drive lines disposed on the PCB substrate.

Figure 3D:
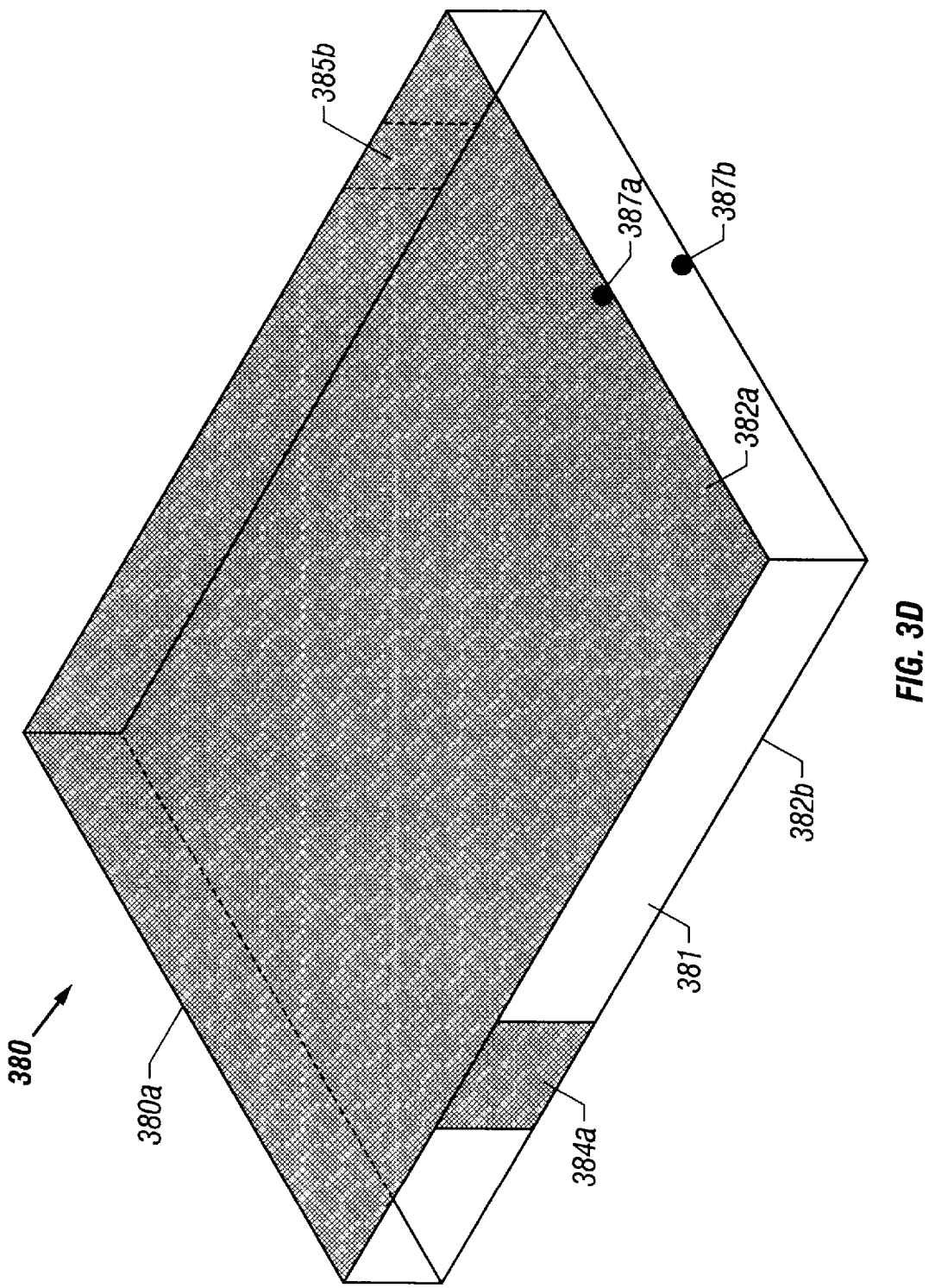
FIG. 3D is a perspective view of PCMCIA RF card/antenna 380.
Figure 3E:
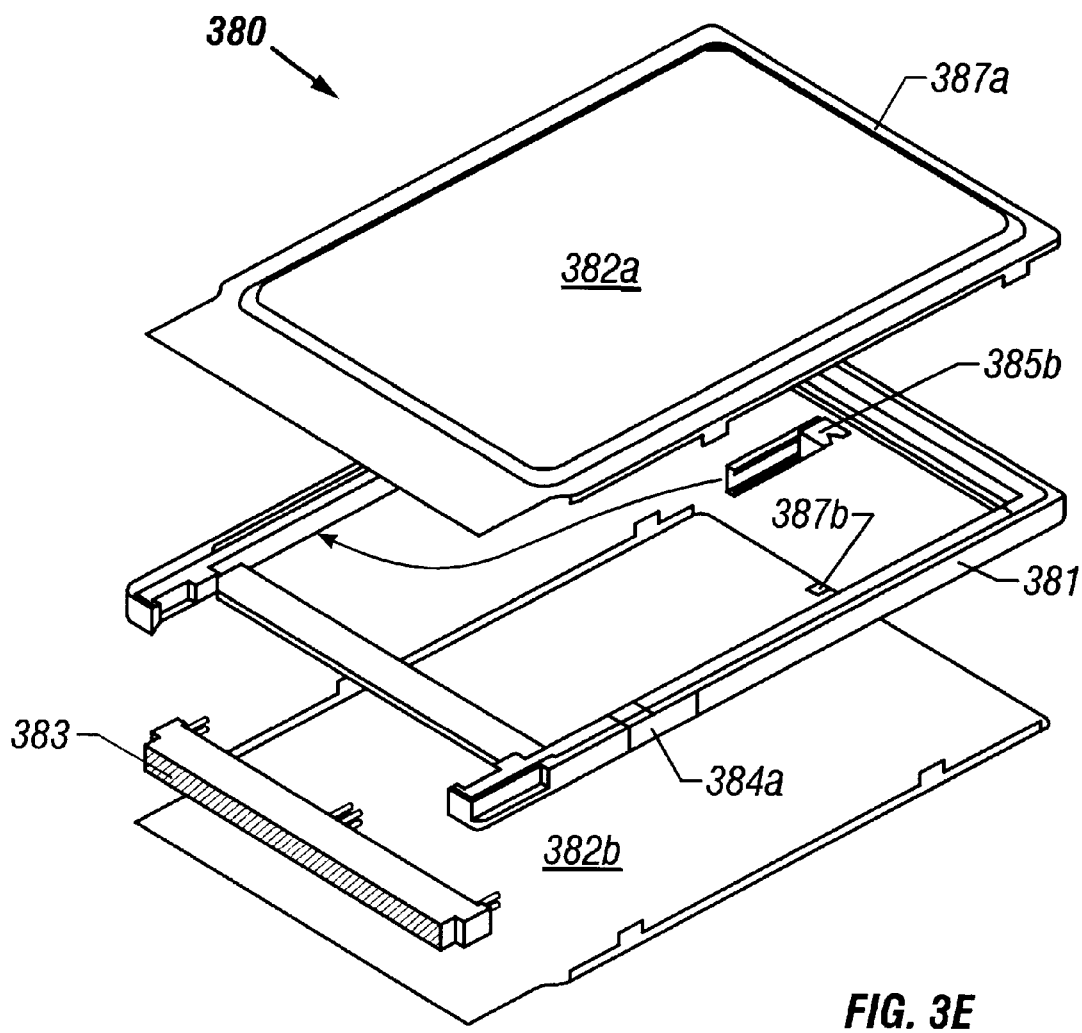
FIG. 3E is an exploded perspective view of antenna portions 382a, 382b, frame 381 and connector 383 of the transceiver according to the present invention.

FIG. 3C4 shows a top plan view of slot antenna 350, described in detail below, on a PCMCIA form factor card or a similar small electronic package, containing transceiver 150. FIG. 3C1 is a view taken along the lines 3C1—3C1 of FIG. 3C4 and illustrates upper cover 382a, lower metal cover 382b, frame 381 and tuning clip 384a. A perspective view of the PCMCIA RF card/antenna combination 380 is illustrated in FIG. 3D. An exploded perspective view of antenna 350 and frame 381 is illustrated in FIG. 3E. Also illustrated in FIG. 3C1 are drive points 387a and 387b to which leads are connected from the printed circuit board to T/R switch 212.

FIG. 3C2 is an end view of the PCMCIA RF card/antenna combination 380 taken along the lines 3C2—3C2 of FIG. 3C4. FIG. 3C3 illustrates the edge of PCMCIA RF card/antenna 380 as viewed along lines 3C3—3C3 of FIG. 3C4. In this view, grounding clip 385b is illustrated. While this invention is described using the PCMCIA form factor, the invention is not limited to any particular form factor or computer system.

Figure 3F:
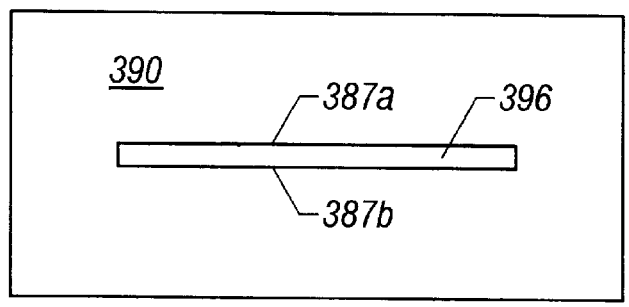
FIG. 3F is a plan view of a prior art conventional slot antenna.
Figure 3G:
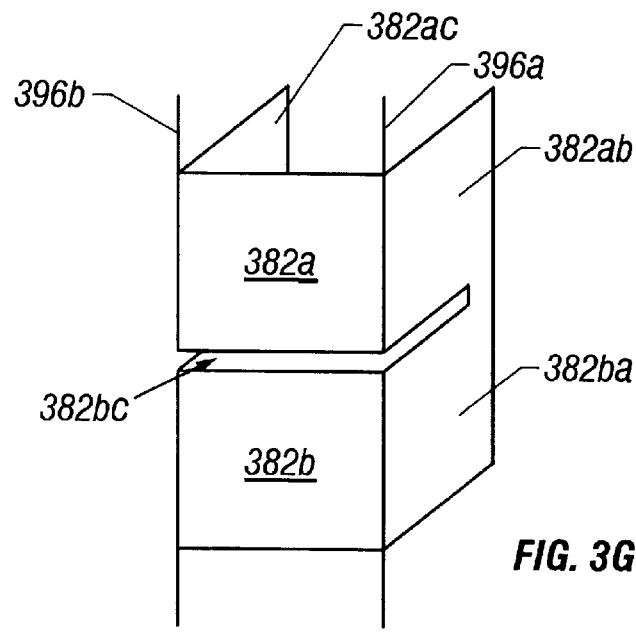
FIGS. 3G, 3H and 3J illustrate sequential steps for making a slot antenna 391 beginning with the structure of slot antenna 390 of FIG. 3F.
Figure 3H:
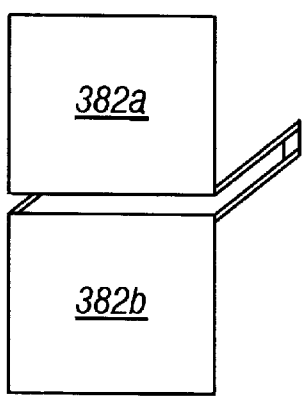
Figure 3J:
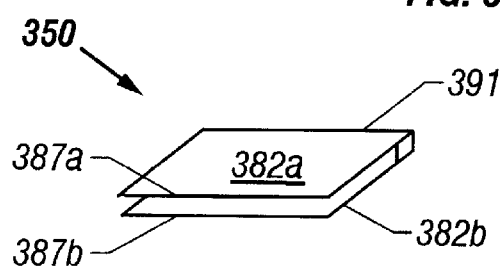
Figure 3K:
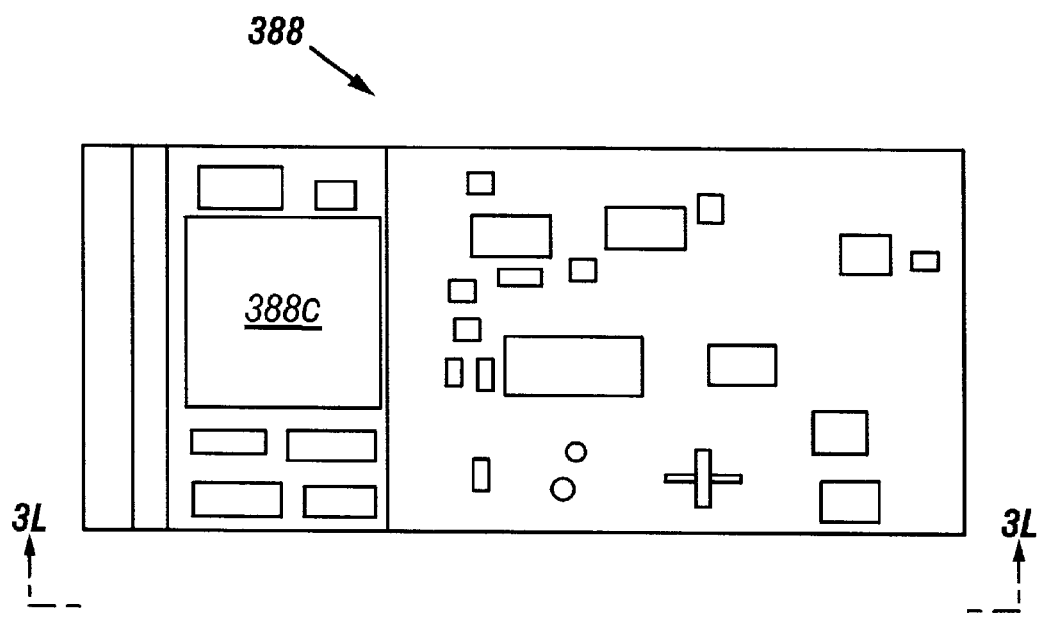
FIG. 3K is a top plan view of a printed circuit board assembly used in the present invention.
Figure 3L:
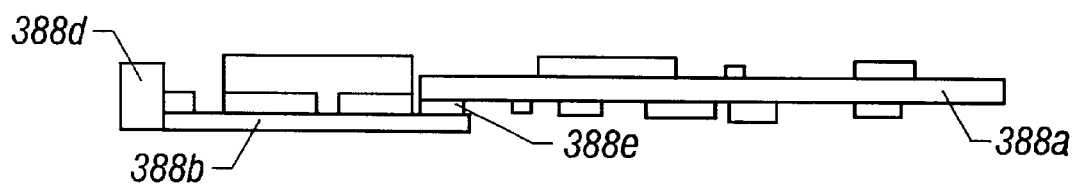
FIG. 3L is a view taken along section 3L—3L of FIG. 3K.

A PCMCIA RF card/antenna 380 is comprised of an insulating frame 381, which may be a plastic material, sandwiched between a pair of metal covers 382a and 382b and a printed circuit board assembly 388 illustrated in FIGS. 3K and 3L. It has been found that a particularly advantageous material for use in constructing insulating frame 381 is polycarbonate material with twenty percent (20%) fiberglass fill. The assembly will be better appreciated by reference to FIG. 3E in which PCMCIA RF card/antenna 380 is illustrated in an exploded perspective view. When fully assembled, printed circuit board assembly 388 is positioned interiorly of frame 381 and between upper and lower covers, 382a and 382b respectively. To reduce complexity of the figure, the printed circuit board assembly 388 on which the electronic circuitry for transceiver 150 is placed is not shown in FIG. 3E. RF card/antenna 380 occupies approximately the same area as a plastic credit card, but is several times thicker. RF card/antenna 380 has a PCMCIA standard 86 pin connector 383 (FIG. 3E) taking up most of the area of the connector end of RF card/antenna 380. RF card/antenna combination 380 is inserted into a PCMCIA slot in the housing of a computer or other peripheral device so that RF card/antenna 380 is substantially enclosed within the housing except for the front end 380b of card (opposite to connector end). Most PCMCIA enclosures provide some level of shielding except for front end 380b. Antenna 350, which is constructed of covers 382a and 382b, along with tuning clips 384a and 385b, is integrated with frame 381 and the printed circuit board assembly 388 to form RF card/antenna 380. A portion of antenna 350 must therefore be in, or attached to, front end 380b to be efficient in radiating and/or receiving RF energy.

Tuning clips 384a, and 385b electrically connect metal covers 382a and 382b and may provide a grounding path for the resulting RF card/antenna 380 to host computer 100 or a digital device depending on the design of the host computer or digital device. With tuning clips 384a and 385b in place connecting upper cover 382a and lower cover 382b, an outwardly facing U-shaped slot is formed around the front portion 380b of RF card/antenna 380 and down each side 384, 385. The U-shaped slot is filled with a dielectric material which may be, for example, polycarbonate with glass fiber, with the dielectric material being provided entirely or in part by insulating frame 381. This U-shaped slot is comprised of a portion of covers 382a and 382b (which form the legs of the U) and tuning clips 384a and 385b which form the bight of the U. A pair of antenna drive points 387a, 387b are coupled to top and bottom covers 382a, 382b, respectively, at their edges in the center of front end 380b, thereby forming slot antenna 350. Antenna 350 resonates at a frequency dependent on the effective dimensions and the dielectric constant of slot 386.

The U-shaped slot described above can be tuned by several methods. Tuning clips 384a, 385b can be relocated or their width modified to vary the effective length of the U-shaped slot, or additional tuning clips (not shown) may be inserted to make the U-shaped slot shorter, thereby increasing its resonant frequency. Conversely, adding a narrower tuning clip in place of tuning clip 385b on side 385 has the effect of lowering the resonant frequency. Drive points 387a, 387b can be relocated to vary the impedance at the driving point.

In some embodiments, antenna 350 is a metal casting. Alternatively, antenna 350 may be constructed starting with a metal sheet 390 having a slot 396 cut in the center as illustrated in FIG. 3F. A method of constructing antenna 350 from sheet 390 is illustrated in FIGS. 3F–3J.

As illustrated in FIG. 3G, sheet 390 is folded back at right angles along axes 396a and 396b to form the structure illustrated in FIG. 3G. Next, the four panels 382ab, 382ac, 382ba and 382bc of sheet portion 390 are removed resulting in the structure shown in FIG. 3H. Sides 382a and 382b are each folded back at right angles to form the structure shown in FIG. 3J which has an open end 391 used for a connector not shown. The resulting slot antenna 350 is a variation of patch antenna 350b, and hence patch antenna tuning techniques, such as the use of shorting stubs and displacement of driving points, for adjusting resonant frequency and impedance of the driving point are equally applicable.

The effectiveness of antenna 350 and its directional radiation pattern is dependent on the shielding effect of host computer's PCMCIA housing, as shown in FIG. 1. This shielding effect is less pronounced for extended PCMCIA card format which has up to 1.5 inch of PCMCIA RF card/antenna 380 protruding outside of the PCMCIA slot of the housing of host computer 100. Although this embodiment of antenna 350 is not omni-directional and therefore is not as effective as a conventional external antenna (e.g. a conventional antenna consisting of a ½ wave dipole or a ¼ wave whip), antenna 350 provides a rugged built-in antenna having a low incremental production cost and RF efficiency sufficient for low power transmissions for a range of about 30 feet.

Referring to FIG. 3K, printed circuit board assembly 388 is illustrated in a top plan view. As mentioned above, printed circuit board assembly 388 is housed within the cavity formed by the combination of insulating frame 381 and metal covers 382a and 382b. Element 388c, which is the digital ASIC, includes data buffers 280, host interface 291 and digital control logic 295. As will best be appreciated by reference to FIG. 3L, printed circuit board assembly 388 is comprised of a first printed circuit board 388a and a second printed circuit board 388b. Bridging connector 388e is used to connect boards 388a and 388b. Two boards are used because of the thickness of part 388c and the limitation of PCMCIA Type II (which is limited to 5 mm). With thinner components, a single board could be used. Also illustrated in FIG. 3L is connector 388d, to provide electrical connection from the elements on printed circuit boards 388a and 388b with the pins of connector 383.

Figure 4A:
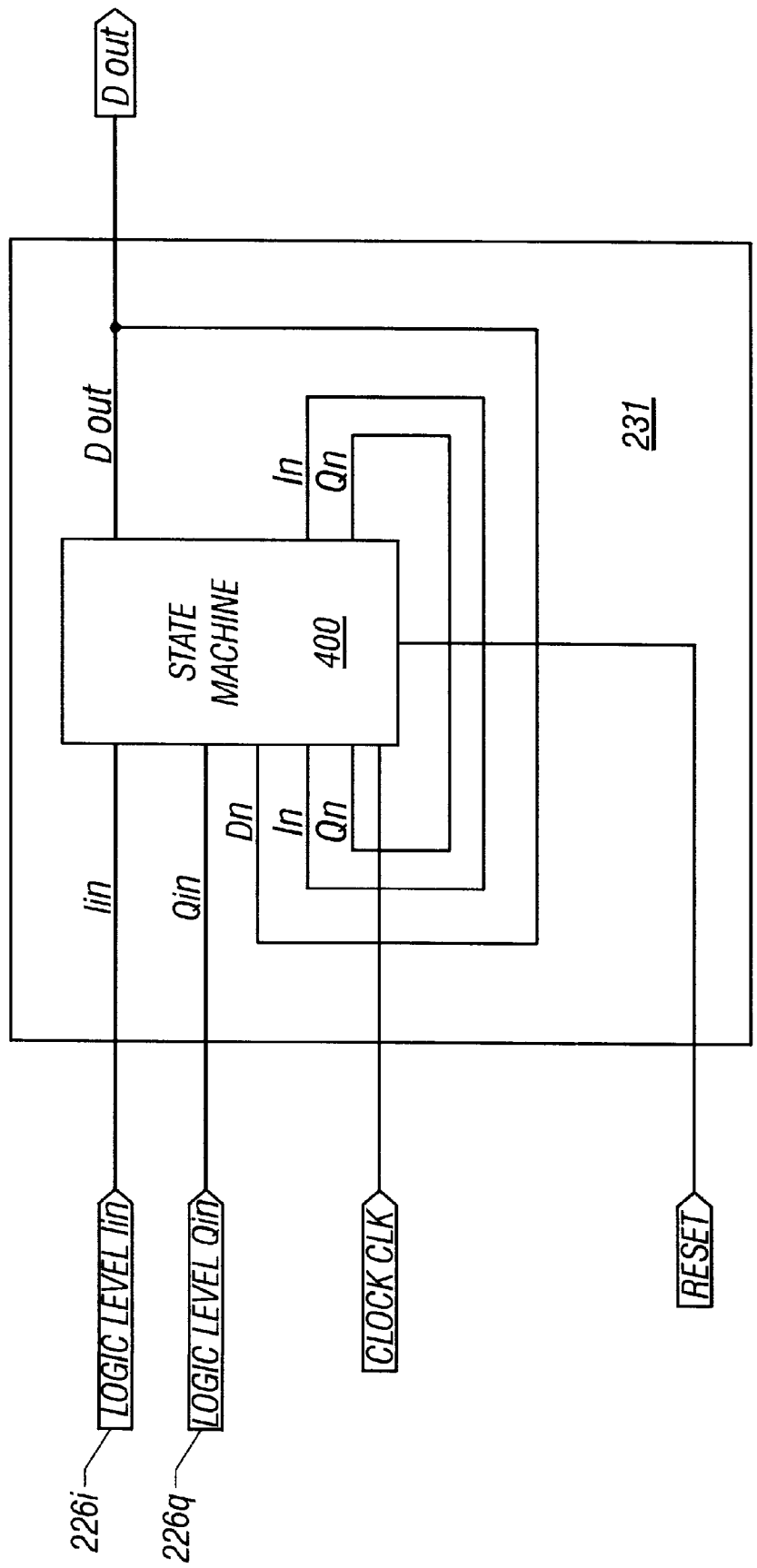
FIG. 4A shows a block diagram of one embodiment of the state machine utilized in demodulating section 230.
Figure 4B:
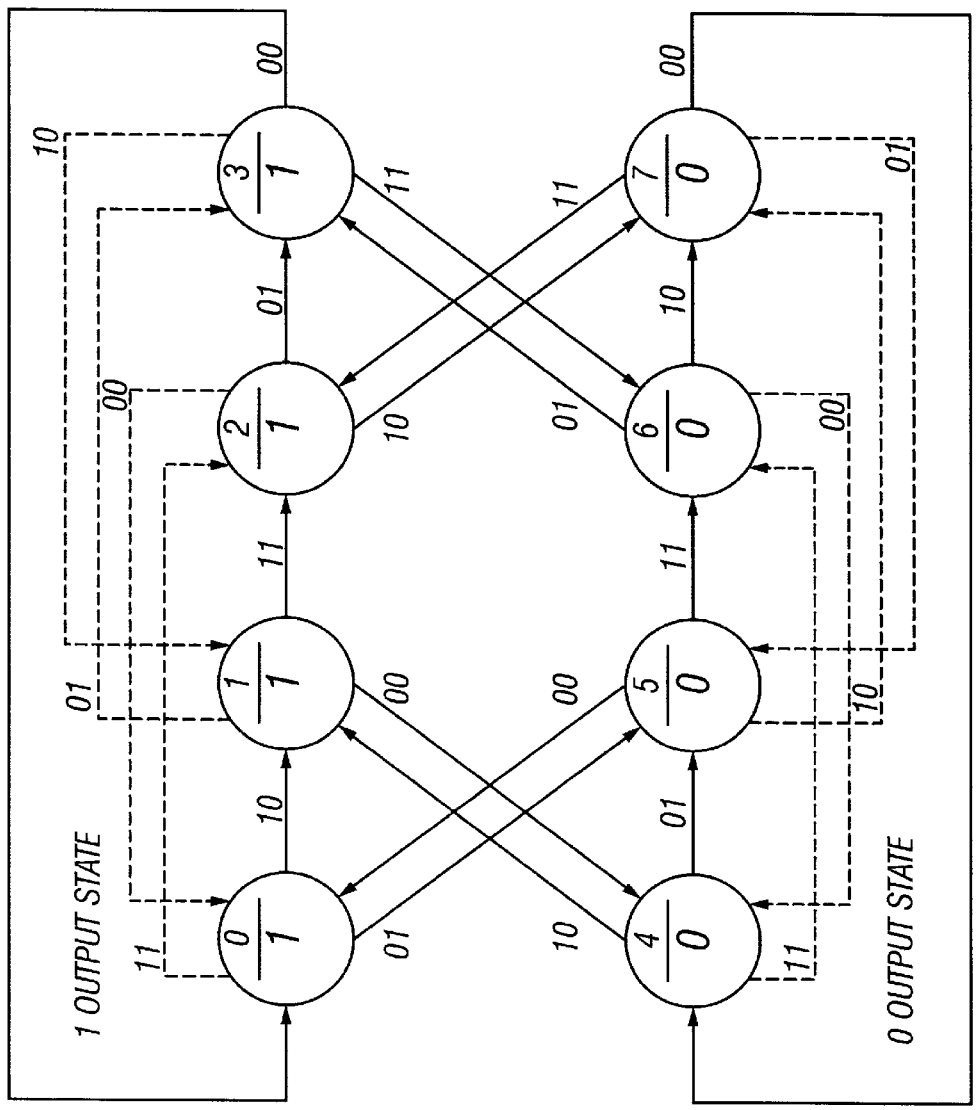
FIGS. 4B and 4C show a state diagram and a detailed logic level implementation, respectively, of the state machine of FIG. 4A.
Figure 4C:
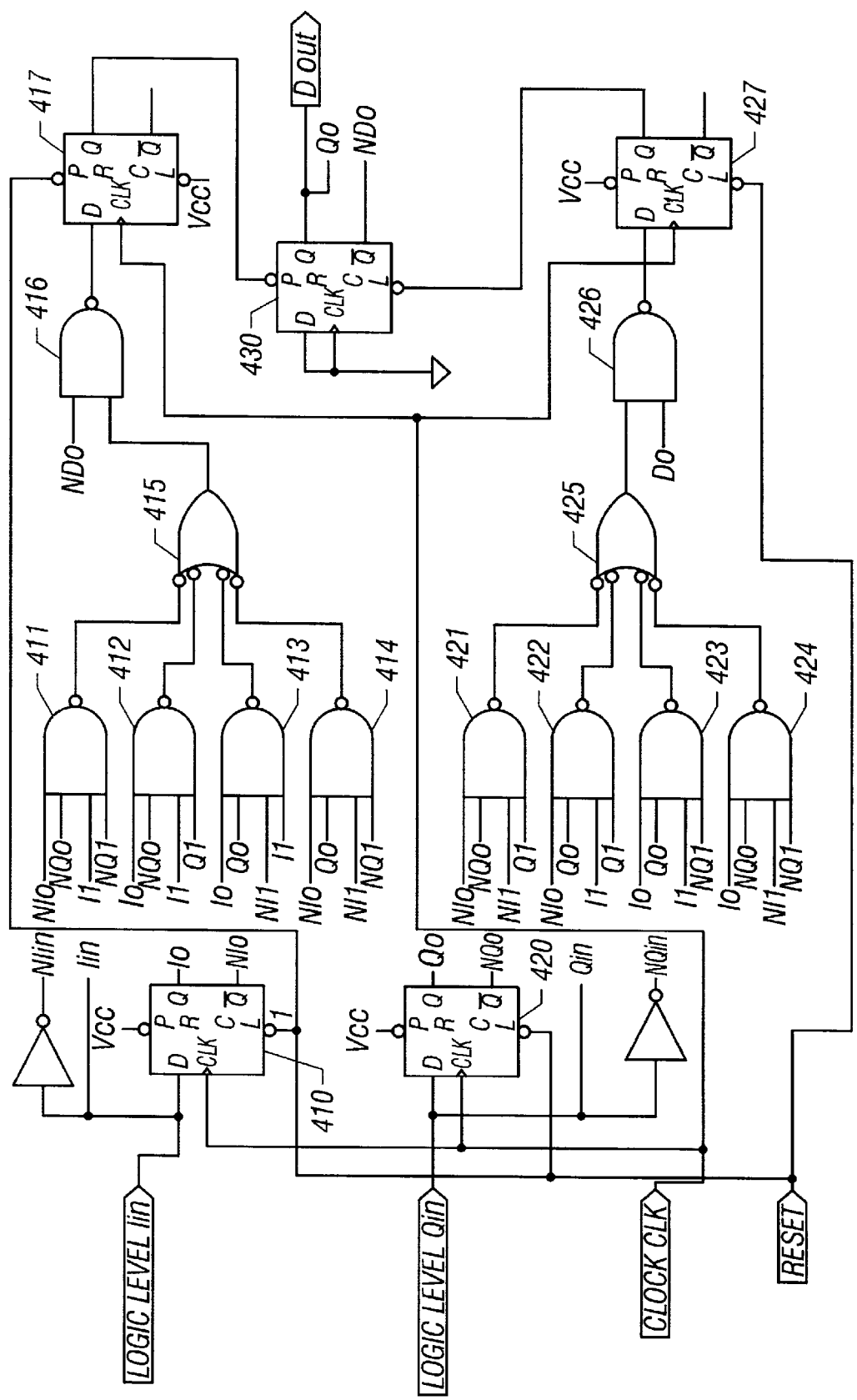

FIG. 4A is a block diagram of one embodiment of the state machine 400 of demodulator 231. FIG. 4B and 4C show a state diagram and a detailed logic level implementation, respectively, of state machine 400 of FIG. 4A. State machine 400 of demodulator 231 operates on an input clock signal CLK and all four edges of logic level signals Iin and Qin from baseband amplifiers/filters 220 thereby improving the signal to noise (S/N) ratio. State machine 400 is implemented using conventional commercially available digital logic components, as shown in FIG. 4C. In FIG. 4C to simplify the drawing, connections between the lines carrying signals NIi, Ii, Io, NIo, Qo, NQo, Qi and NQi and the devices receiving those signals are not shown, but it is to be understood that such connections are made.

Although state machine 400 can be implemented solely by using AND/OR programmable logic components, five D-type latches 410, 420, 417, 427 and 430, triggered by clock signal CLK, are incorporated into state machine 400, thereby improving the signal to noise ratio of state machine 400. Latches 410, 420, 417, 427 and 430 provide additional internal state information within state machine 400, enabling state machine 400 to better detect and ignore several illegal state changes caused by any signal noise. Clock signal CLK is generated by a clock signal generator in digital control logic 295. Preferably, clock signal CLK has a frequency at least ten times that of the frequency of logic level signal Iin and Qin. The clock signal generator may be implemented using any well known clock signal generator circuit, such as by dividing down the reference oscillator.

The operation of state machine 400 is as follows. Four input signals are used by state machine 400, more particularly, logic level signals Iin and Qin, and clock signal CLK and Reset signal. From these input signals, state machine 400 of demodulator 231 provides an output signal $D_{OUT}$. As discussed above, logic level signals Iin and Qin are normally in quadrature, i.e. 90° out of phase, however they may be corrupted by noise pulses.

Signal Reset is used to set output signal $D_{OUT}$ in a preferred default state. Conversely, if an initial default state is not needed, then signal Reset is not required. Since clock signal CLK has a clock rate which is at least 10 times the expected clock rate of the incoming data stream (Iin and Qin), noise reduction is provided.

The selection of the clock frequency for clock signal CLK is a compromise between overall response time and S/N ratio. A faster data transmission rate minimizes data transmission delays but increases the detrimental effects of noise pulses. Conversely, a slower data transmission rate increases the S/N immunity but results in an increase in data transmission time. Clock signal CLK may be, for example, selected to have a frequency of 7 MHz, which may be derived by dividing down the 14.7 MHz signal provided by reference oscillator 201 in oscillator-section 200 (FIGS. 2A and 2F). Note that noise pulses occurring between clock transitions do not affect the output of state machine 400. Although clocked D-type latches 410, 420, 417, 427 and 430 are not essential to the basic principle of operation of state machine 400, by clocking the input signals Iin and Qin and generating two additional internal signals $I_0$ and $Q_0$, these latches considerably improve the S/N ratio of demodulator 231.

Referring to FIG. 4B, which shows eight latched input states and their associated output states, it will be appreciated that state machine 400 is only responsive to input signal edge transitions and not to input signal levels. Note that in FIG. 4B, bold solid lines represent input transitions within an output state, thin solid lines represent transitions between output states, and dotted lines represent illegal or dual input transitions. There are four state transitions which causes output signal $D_{OUT}$ to go from a "1" to a "0" state, and four state transitions which result in output signal $D_{OUT}$ going from a "0" state to a "1" state. All other state transitions are ignored by state machine 400.

Referring to FIG. 4C, input logic level signals Iin and Qin are applied to the "D" input of D-type latches 410 and 420, respectively. Latches 410 and 420 are clocked by clock signal CLK. The respective "Q" outputs latches 410 and 420 provide clocked input states $I_0$ and $Q_0$. A first set of four-input NAND gates 411, 412, 413 and 414, whose outputs are coupled to a corresponding set of inverted inputs of OR gate 415, detect the input state conditions for which output signal $D_{OUT}$ should be a "1" state. A second set of four-input NAND gates 421, 422, 423 and 424 whose outputs are coupled to a corresponding set of inverted inputs of a second OR gate 425, provide detection of the four transition states for which output signal $D_{OUT}$ should be a "0" state. Note that the (four) inputs nodes of each of NAND gates 411, 412, 413, 414, 421, 422, 423, 424 are coupled to two latched (stable) state nodes and two transition state nodes.

Table I below shows the two sets of four state transitions detectable by state machine 400 and the two respective $D_{OUT}$ states.

TABLE I

| INPUTS FOR $D_{OUT}$ = ONE | | | | INPUTS FOR $D_{OUT}$ = ZERO | | | |
|---|---|---|---|---|---|---|---|
| Iout | Qout | Iin | Qin | Iout | Qout | Iin | Qin |
| 0 | 0 | 1 | 0 | 0 | 0 | 0 | 1 |
| 1 | 0 | 1 | 1 | 0 | 1 | 1 | 1 |
| 1 | 1 | 0 | 1 | 1 | 1 | 1 | 0 |
| 0 | 1 | 0 | 0 | 1 | 0 | 0 | 0 |

Figure 4D:
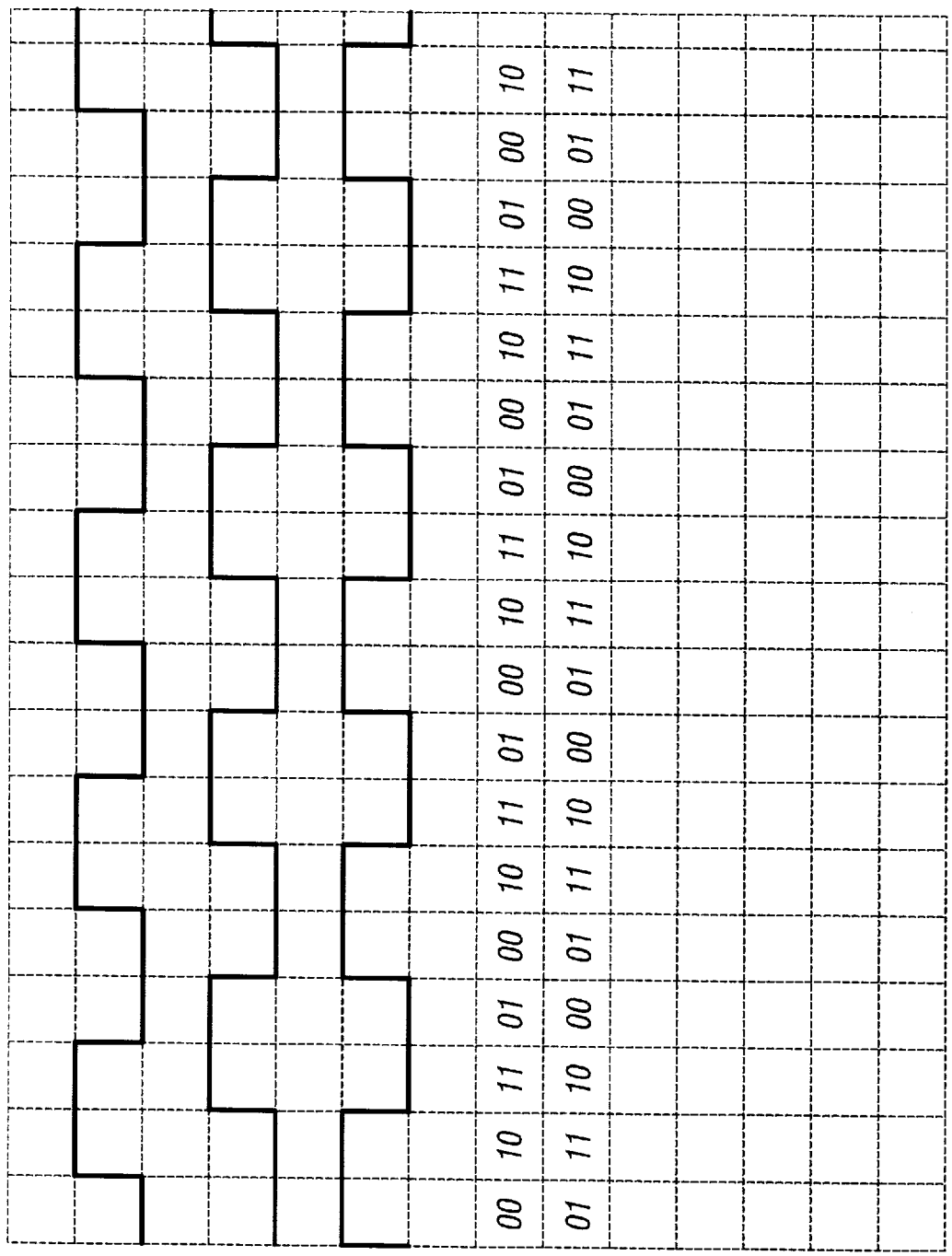
FIG. 4D shows a timing diagram illustrating the I and Q states of the state machine.

FIG. 4D is a timing diagram illustrating the corresponding I and Q states. The timing diagrams show the quadrature relationships between $I_{in}$ and $Q_{in}$ with $I_{in}$ as the reference and $Q_{in}$ lagging ($Q_{in}$ for $Q_{out}=1$), and leading ($Q'_{in}$ for $Q'_{out}=0$). The stable states of the $I_{in}$ and $Q_{in}$ are then shown in the drawing for $Q_{out}=1$ and for $Q'_{out}$. The transitions that determine the output of the state machine can be seen by reading pairs of bits horizontally from left to right.

Referring to FIG. 4C, three additional D-type latches 417, 427, 430 prevent switching transients caused by noise and interference from upsetting output signal $D_{OUT}$. Output signal $D_{OUT}$ can only change state when the inputs of latches 410, 420, 417, 427 and 430 are clocked, thereby providing improved signal to noise ratio.

Signal to noise ratio is improved by a factor of four because of the sixteen possible state transitions of state machine 400, only four state transitions can conceivably take output signal $D_{OUT}$ to an unintended incorrect state. Nevertheless, when a noise pulse or spike does cause output signal $D_{OUT}$ to take an incorrect state, there is a continuous sequence of state transitions that will cause state machine 400 to return to a correct state, thereby enabling state machine 400 to recover from an erroneous state. Hence, state machine 400 of demodulator 231 has improved S/N capability, resulting in a reliable low cost receiver section for transceiver 150, without the need for a sophisticated demodulator which would be too expensive and all too bulky for use in a low cost compact format, e.g. the PCMCIA card format.

In addition, an optional analog or digital filter (not shown), selected to match the signal characteristics of demodulator 231, could be added to filter the logic level input signals Iin, Qin, of demodulator 231, to further improve signal to noise ratio. Similarly, an optional output filter (not shown) or other signal processing means for processing output signal $D_{OUT}$ could also be used to further improve the output noise immunity of demodulator 231.

In one implementation, transceiver 150 is one of a plurality of independent unsynchronized transceivers operating in a local area network environment. Each RF transceiver needs to avoid interfering when a valid transmission which is in progress. When several transceivers contend for the same frequency/channel, the channel is effectively blocked unless the transceivers have some means of effectively sharing the channel and resolving any potential contention.

In some embodiments, transceiver 150 uses a Collision Avoidance (CA) technique in a wireless Carrier Sense Multiple Access (CSMA)/CA network implementation. Detection of contention/collision is made possible by the presence of a signature word embedded in the serial data bit stream at frequent intervals using either hardware or firmware in the transmitter. This is explained fully below in conjunction with FIGS. 5A through 5E. Transceiver 150 recognizes this signature word using hardware or firmware in the receiver thereby identifying the transmission as a "valid" network signal.

Figure 5A:
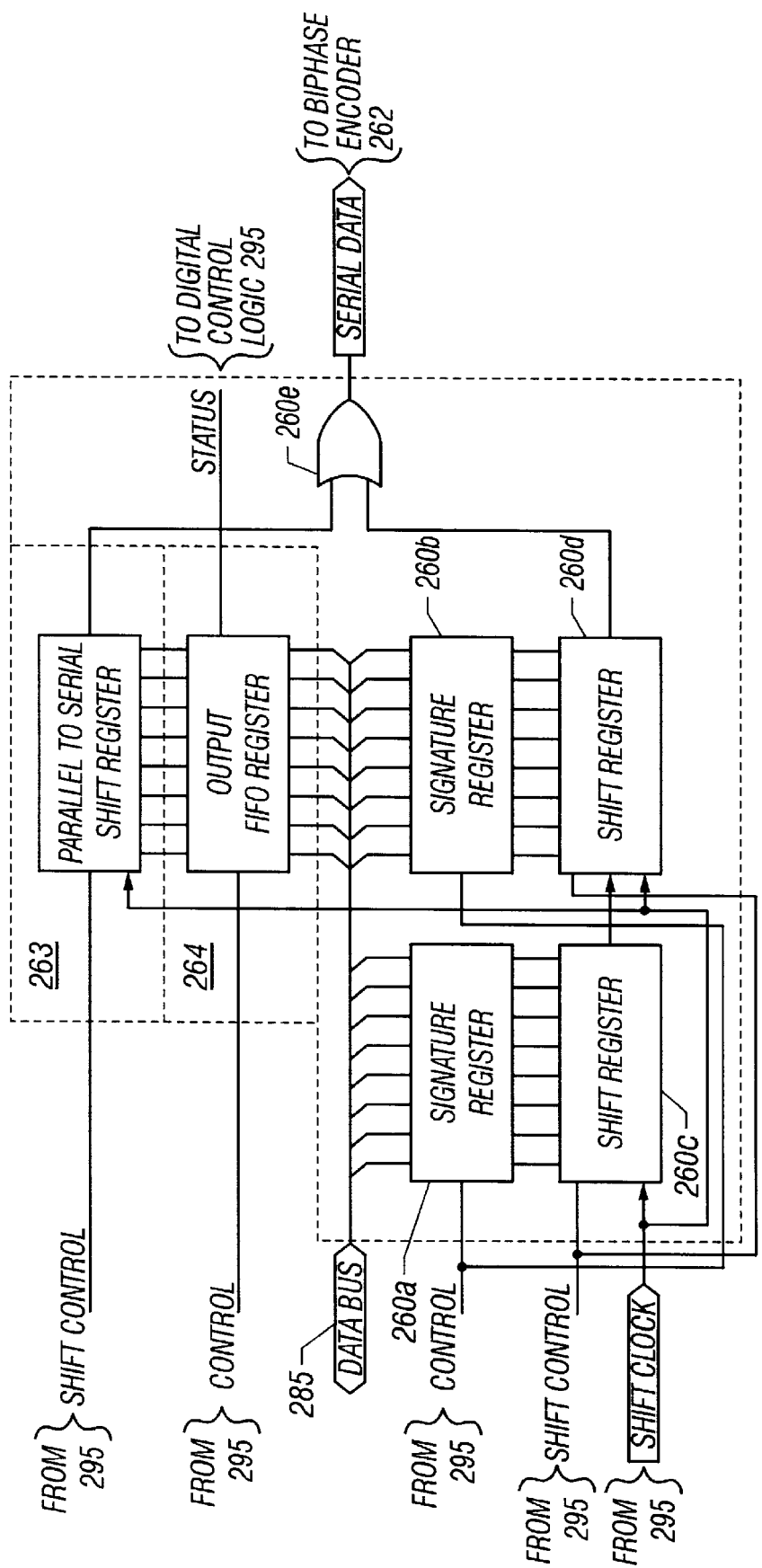
FIGS. 5A and 5B show portions of modulating section 260 and demodulating section 230, respectively, in accordance with the invention.
Figure 5B:
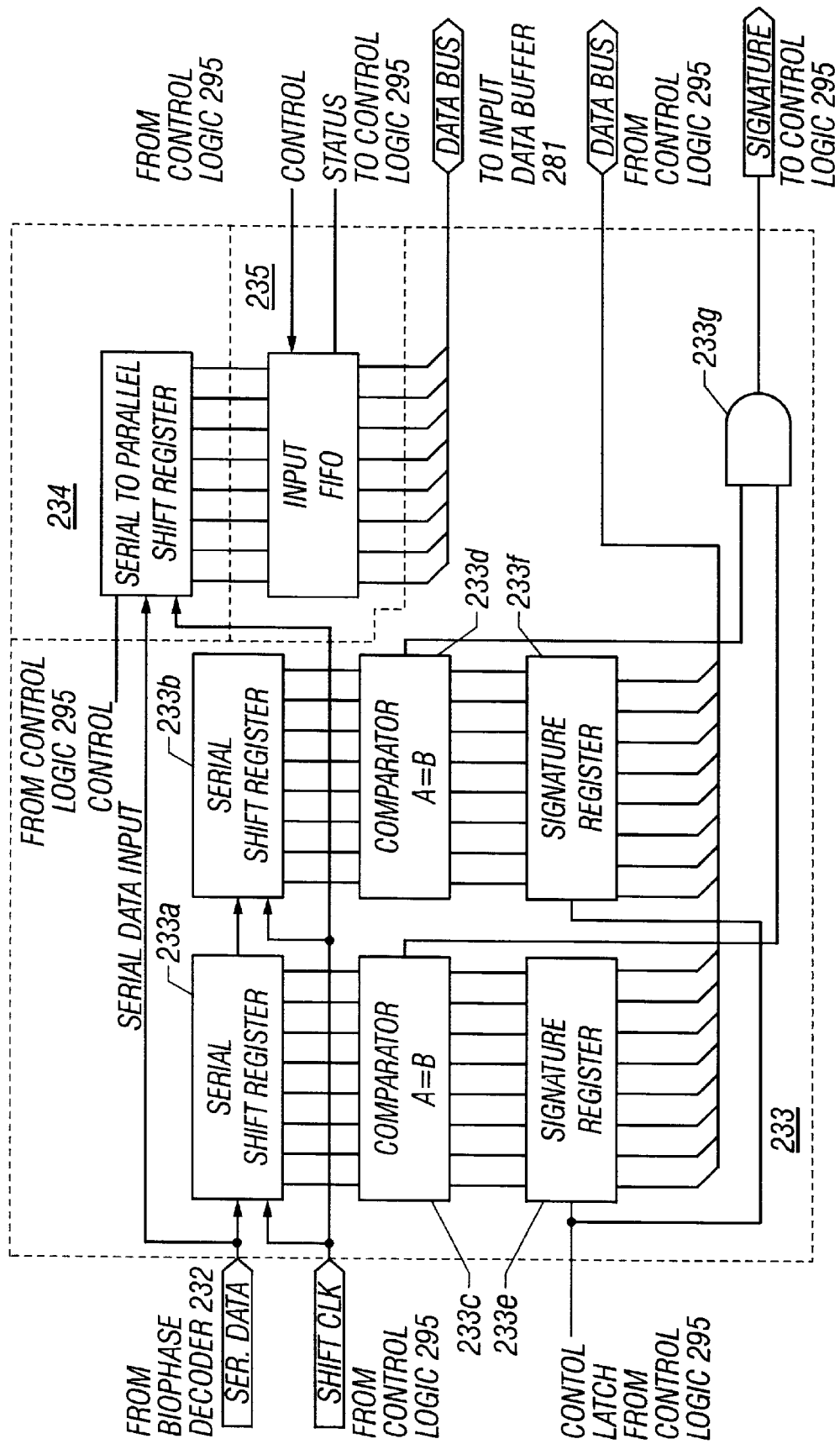

As discussed above, signature word protocol management when implemented in hardware is delegated to modulating section 260 and demodulating section 230. FIGS. 5A and 5B show detailed implementations of portions of modulating section 260 and portions of demodulating section 230, respectively, in accordance with the invention. Referring to FIGS. 2G and 5A, modulating section 260 comprises of two alternate data paths between the data bus 285 and the input node of biphase encoder 262. The first data path is for loading a pair of valid signature bytes into signature registers 260a and 260b (FIG. 5A). Subsequently, the signature bytes stored in signature registers 260a and 260b are shifted into shift registers 260c and 260d respectively. Data bytes are then loaded into output FIFO register 264 to be shifted one byte at a time into parallel to serial shift register 263.

When transceiver 150 is ready to transmit a data packet, the shift registers holding a pair of valid signature bytes, i.e. shift registers 260c and 260d (FIG. 5A), which are coupled via an OR gate 260e to biphase encoder 262 (FIG. 2G), output signals corresponding to the signature bytes to VCO 204 via modulator 261. The data is clocked through shift registers 260c and 260d under control of firmware or control logic hardware. The data bits shift VCO frequency between two frequencies to produce a standard wideband FSK modulation of the transmitter oscillator. This is followed by the data bits which are propagated from output FIFO register 264 through parallel to serial shift register 263, to OR gate 260e and on to biphase encoder 262 (FIG. 2G) where the data bits are modulated by modulator 261. The modulated signal from modulator 261 is then output to summing junction 204a of VCO 204 (FIG. 2F).

Conversely, as shown in FIG. 5B, when transceiver 150 is in the receive mode, demodulating section 230, using a set of comparators 233c and 233d, compares the signature bytes of an incoming data packet. Signature registers 233e and 233f are preloaded with a valid signature word. Incoming data bytes all go through shift registers 233e, 233b enabling comparators 233c, 233d to compare the incoming data stream two bytes at a time. When both comparators 233c and 233d detect a match, i.e. transceiver 150 recognizes a valid signature word, a control signal is sent from gate 233g signalling to the digital control circuity of transceiver 150 or host computer 100 that a valid data bit stream is to follow.

A successful detection of two valid signature words enables serial to parallel shift register 234 to begin accepting incoming data, which is fed one byte at a time into input FIFO register 235 (FIG. 2G). The data stored in input FIFO register 235 is then transferred into input data buffers 280 (FIG. 2G). Meanwhile, comparators 233i c,233d, together with serial shift registers 233a, 233b continue to compare every subsequent pair of data bytes for a possible valid signature word. Hence, whenever a valid signature word is detected, a digital control signal is outputted through OR gate 233g to the microcontroller portion of digital control logic 295 in transceiver 150.

Demodulating section 230 provides the CSMA/CA RF local area network with a means of collision avoidance by detecting the existence of valid traffic on the network. By eliminating the need for carrier frequency detection, transceiver 150 can accurately identify valid network traffic while ignoring invalid transmissions and noise signals. As such, with signature information inserted at specific intervals in every packet of data transmitted, valid network data transmissions can be identified with a high probability of accuracy.

In one embodiment, the signature word is used as an identification field for detecting the start of a data packet by inserting the signature word in the header of the data packet. Demodulating section 230 detects the signature word in the packet header prior to synchronizing the subsequent serial data bit stream. Distinct signature words can be used to distinguish the source of traffic whenever multiple transceivers are operating on the same frequency or channel within a physical facility. In this embodiment, the contention logic is implemented in firmware, i.e., without dedicated contention hardware. The same function can also be accomplished by hardware, software or combinations thereof, by one ordinarily skilled in the art.

Data is transmitted in packets of predetermined structure and maximum size so the data can be checked and retransmitted if it is not received correctly. It is necessary to avoid transmitting a packet by a second transmitter when another packet is being transmitted in the same channel by a first transmitter. In prior art systems, collision avoidance with a packet in progress is usually provided for by some form of carrier detection system. Carrier detection has the disadvantage, particularly in the ISM band, that it often falsely identifies noise, interference or adjacent channel traffic, as a packet in progress.

Figure 5C:
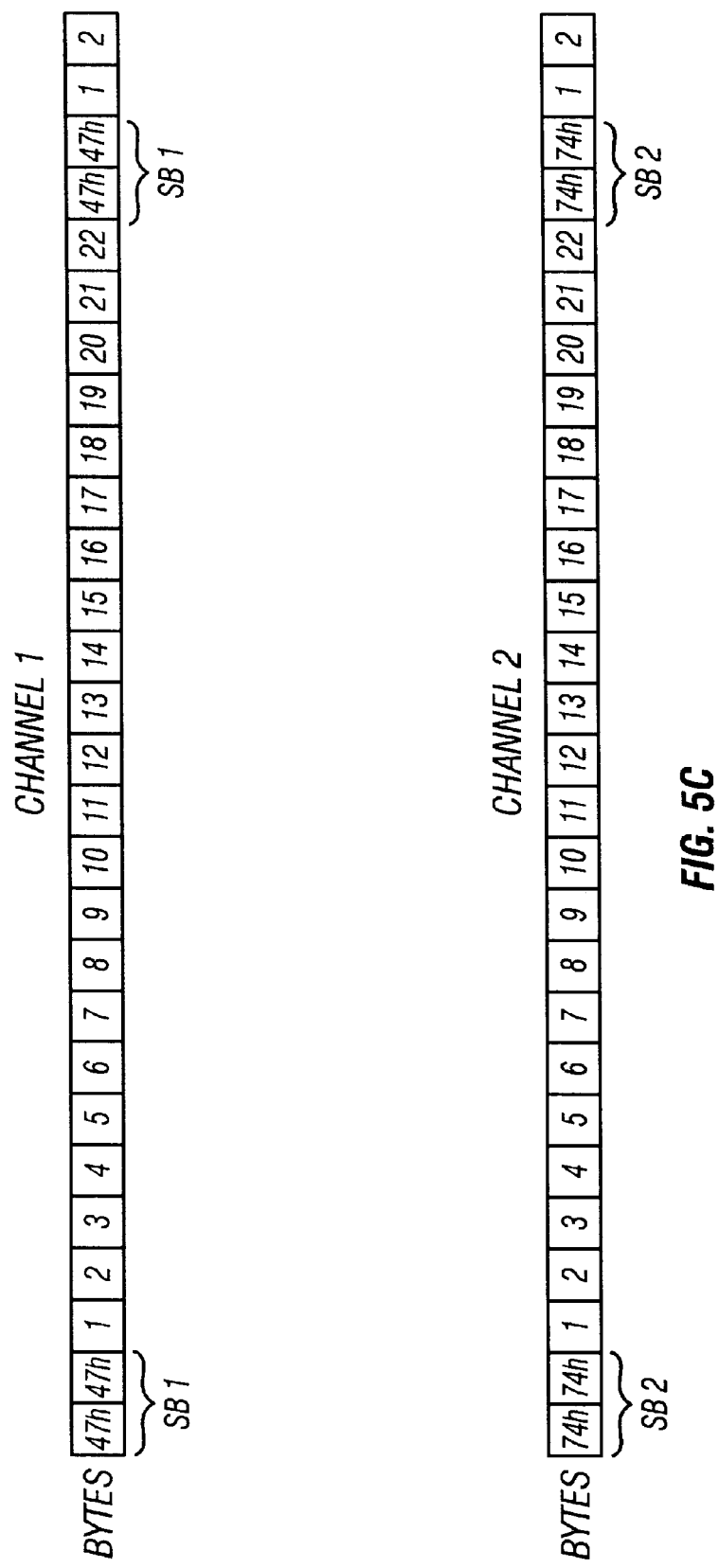
FIG. 5C shows one implementation of the invention wherein a signature word is embedded in the data bit stream at periodic intervals.

The disadvantage of carrier detection can be overcome by inserting special bytes, or signature words, into the data stream of the packet to identify the packet as in-channel data that should not be interfered with. Each channel can have a unique signature word, to distinguish between in-channel and adjacent channel signals, for example see in FIG. 5C signature words SB1 and SB2. FIG. 5C shows part of two packets on adjacent channels, with different signature words to distinguish out-of-channel interference from in-channel collision of packets.

This signature word signal can be used in the header of the packet to identify the start of a packet. The signature word at the start of the packet can be repeated so that the same hardware or software can be used for detecting the start of header as is used for collision avoidance in the body of the packet.

FIG. 5C shows one implementation of the invention wherein the signature word is embedded in the data bit stream within a packet at periodic intervals. For example, two different signature words SB1 and SB2 allocated for channel 1 and channel 2 are 4747h and 7474h, respectively. Signature words SB1, SB2 are inserted within the data packet after every twenty-two bytes of data, allowing a listening transceiver, e.g. transceiver 150, to detect network traffic on its channel within 2¼ milliseconds at a corresponding data rate of 115.2 Kbits/second. The probability of an erroneous identification of the channel traffic is 0.000015. This is computed by considering that two bytes=16 bits with $2^{16}$=65,536 possible bit patterns for random noise, the probability of noise generating the one pattern that represents a random signature is 1/65,536=0.00001526.

In addition, the only penalty for incorrect recognition of a "valid" signature word due to random signals is one packet delay of a few milliseconds, i.e., the time period needed for the random back-off and listen cycle. Signature word detection advantageously allows communications under similar circumstances that are very difficult using a conventional carrier frequency detection scheme. Further, the signature word protocol overhead imposes an insignificant affect on the overall data throughput. This overhead is computed considering that 1/12 of the characters transmitted in the data part of a packet are signature characters, but the ratio of data packet to overhead and delay times reduces the effective reduction of throughput to less than 5% in a clear channel.

Figure 5D:
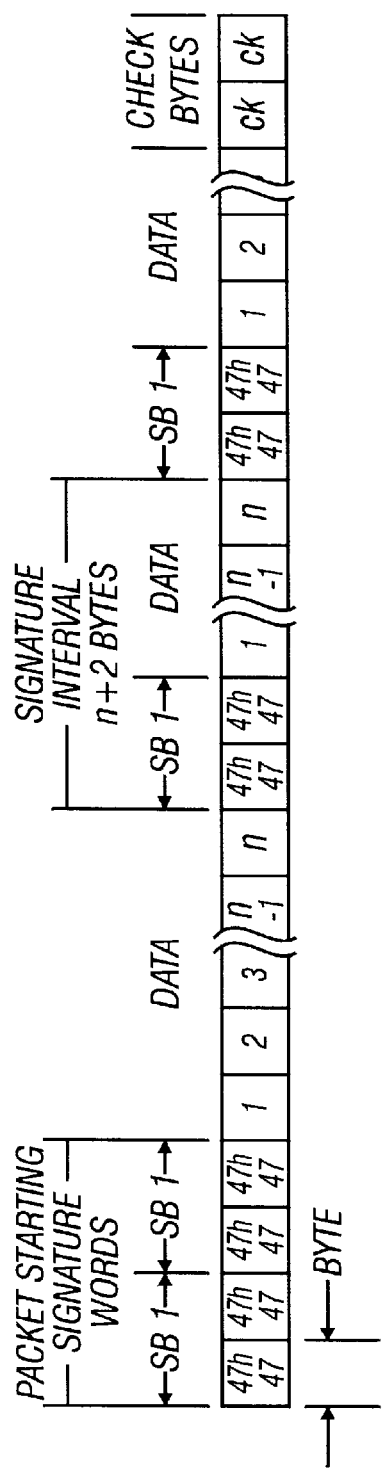
FIG. 5D illustrates a typical data packet transmitted using the channel 1 signature words.

FIG. 5D illustrates an overall data packet using the channel 1 (FIG. 5C) signature word. It will be noted that signature word SB1 is inserted twice at the beginning of the data packet, and at periodic intervals within the data packet a single signature word SB1 is provided. More particularly, at the beginning of the data packet signature word SB1 is inserted twice and consists of hexadecimal pattern 47H provided in four bytes, whereas within the data packet, signature word SB1 is inserted periodically as indicated in FIG. 5D. Although as pointed out above with regard to FIG. 5C that the signature words are inserted within the data packet after every 22 bytes of data, it is of course within the discretion of the designer to decide how frequently the single data pattern may be inserted in the packet. Additionally, although the signature words in the exemplary system employs two bytes per word, it will of course be appreciated that a single byte or another number of bytes or bits may be used in the signature word.

Figure 5E:
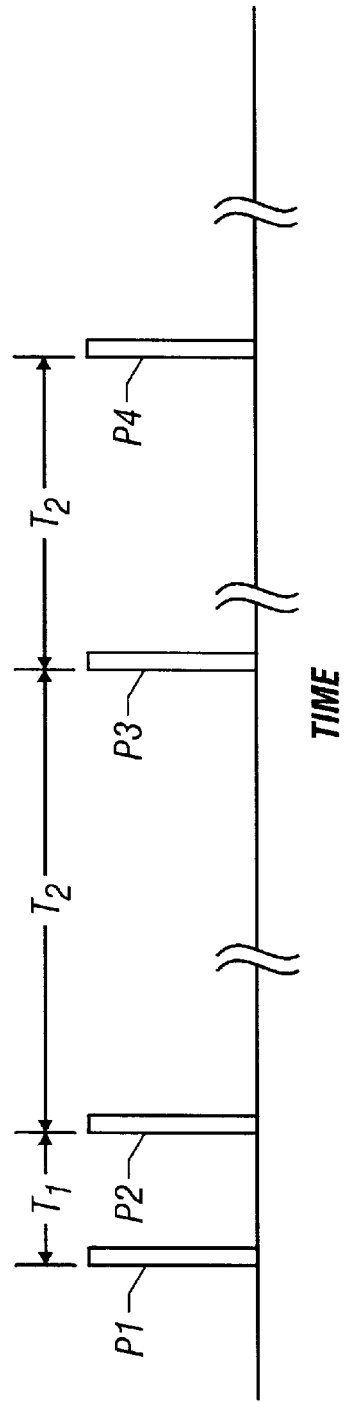
FIG. 5E illustrates the output pulses from the signature detector resulting from the received signature words illustrated in FIG. 5D.

FIG. 5E illustrates signature detector output pulses from gate 233g (FIG. 5B) which is included in demodulating section 230. It will be noted that the signature pulses in FIG. 5E are oriented with respect to the start of the data packet of FIG. 5D and also that pulse P1 results from the first occurrence of signature word SB1, pulse P2 is generated by the second occurrence of signature word SB1. Similarly, both patterns P3 and P4 are generated by the signature words SB1 located within the data packet. It will be appreciated that these pulses provide the ability to identify the start of the data packet by the two closely spaced pulses P1 and P2. Also during the data packet the pulses P3 and P4 are used to inhibit the start of transmission by another transceiver on the same channel and thus avoid a collision with a packet in progress. The additional overhead due to inserting the signature words is compensated by avoiding collisions and the requirement for retransmissions. The use of signature words also avoids delaying the start of a transmission due to false alarms that would occur if the carrier detection technique is used for determining when transmission may begin.

It will be noted in FIG. 5E that the pair of signature words SB1 at the beginning of the data packet result in output pulses P1 and P2 spaced apart by time interval $T_1$. The single signature word SB1 repeated within the data packet results in intervals $T_2$. With these timing relationships, it is possible to achieve both power savings and the collision avoidance. With regard to power saving, since the beginning of a data packet provides a pulse interval $T_1$, the receipt of pulses spaced apart by this time may be used as a signal to turn on the processor in the receiving section of the intended transceiver since the transceiver will be alerted that a data packet intended for it is being sent. The signature words spaced apart by time $T_2$ permit a transmitter that is ready to transmit data to listen for the receipt of signature words within the time frame $T_2$ and if a time period greater than $T_2$ passes without the receipt of a signature pulse, then the transmitter may proceed with its transmission since the lack of occurrence of pulses within that time frame indicates that no other transmitter on the channel is transmitting data.

As discussed above, in the embodiment illustrated in FIG. 5B, demodulating section 230 is implemented using dedicated hardware, e.g., using a serial shift register 233a, 233b, digital comparator 233c, 233d, and a predetermined (default) signature word stored in shift register 233e, 233f. Alternatively, during operation, signature shift registers 233e and 233f can be loaded with an alternative signature word defined by host computer 100. The alternative signature word is selected for a particular frequency (channel) so that close frequency spacing between adjacent channels will not result in the interference of another channel.

FIGS. 5F, 5G and 5H show typical streams of data packets. FIG. 5F shows the 32 byte header, followed by 512 bytes of data, followed by a check sum byte, followed by a wait for acknowledge, then an acknowledge, a wait for listen to verify an empty channel, and next a data packet. Typical bytes per function and delay times are also shown. FIG. 5G shows the data stream with the insertion of signature words (two bytes) in the area of FIG. 5F which was previously dedicated only to data. FIG. 5H shows packets of FIG. 5G labeled for throughput calculation;

tH=header time tSP=signature packet time tCS=check sum time tR=transmit to receive switching time tA=acknowledge time tL=listen for traffic in channel time.

These times are dependent on hardware parameters and network protocols.

In some embodiments, in accordance with the invention, transceiver 150 is equipped with power management capability to reduce overall power consumption when various portions of transceiver's circuits are not needed, e.g. in sleep mode. First, functionally distinct circuit portions of transceiver 150 are powered down separately when not in operation. Second, the receiving portion of transceiver 150 is powered down when there is no incoming traffic, with a timer set to a time coordinated with the transmitter wake-up period (described below) to periodically wake up the receiving portion to listen for network activity. The duty cycle of the transmitting portion (i.e., the percent of time the transmitter is on) of transceiver 150 is about 1% for typical applications, with power consumption during transmission comparable to that when receiving. The duty cycle of the receiving portion of transceiver 150 is reduced to about 10%, and transceiver 150 is allowed to idle (or "sleep") 89% of the time. Third, the system clock signal CLK, which is running at a frequency of 12 MHz to 16 MHz, is disconnected from portions of transceiver 150 which are disabled during the sleep mode. For example, during the sleep mode, all circuits except the wake-up timer and associated divider chain are disconnected from the system clock CLK. In an alternative embodiment, the wake-up timer is driven from a lower speed clock running at 32 KHz to further reduce power consumption.

However, since by design oscillator section 200 draws very little power, it is not entirely powered down to conserve power. Keeping portions of oscillator section 200 powered eliminate any oscillator re-starting overhead, and improves the stability of oscillator section 200. During the sleep mode, VCO 204 and reference oscillator 201 remain powered. The synthesizer 202 may be placed in the sleep mode to preserve the register settings and the current drain will then be about one microamp for this component. As such, the low power oscillator section 200 permits the "sleep-to-receive" ratio of transceiver 150 to be optimized.

Figure 6A:
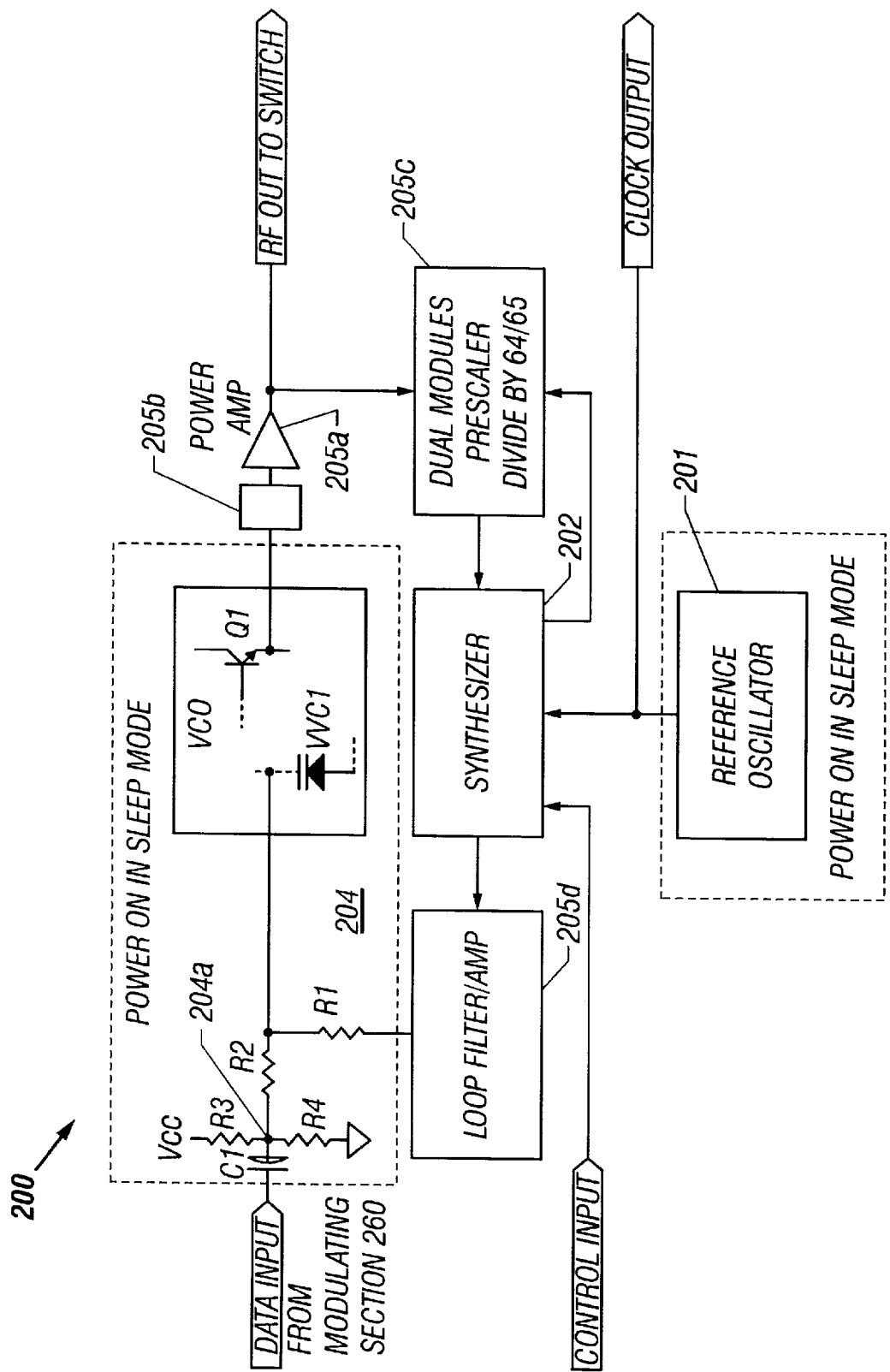
FIG. 6A is a detailed block diagram of the oscillator section showing both the reference oscillator and VCO which remain powered when the transceiver is in a sleep mode.

FIG. 6A is a detailed block diagram of oscillator section 200, showing both reference oscillator 201 and VCO 204 remaining powered when transceiver 150 is in sleep mode. Resistor R1 is the summing junction resistor coupled to loop filter amplifier 205d. Resistor R2 is the summing junction resistor coupled via blocking capacitor C1 to modulating section 260. Resistors R3 and R4 form a voltage divider and have resistance values selected to provide center frequency of 915 MHz, allowing the summing junction signal to be overridden by the output signal from modulating section 260, but still capable of providing a stable default voltage to varicap VVC1 when modulating section 260 and loop filter amplifier 205d are powered down. The ratio of the resistive values (which may be calculated using standard voltage divider formulas to give the required voltage measured when the VCO is locked at the center of the channel) of resistors R3 and R4 is selected to tune the frequency of VCO 204 to the middle of the desired frequency band. For example, for the 900 MHz ISM band the frequency is selected to be 915 MHz which is computed by (902+928)÷2=915 MHz.

As discussed above, with key portions of oscillator section 200 remaining powered (on) during the sleep mode, when power is restored to synthesizer 202 it returns to operation and sets VCO 204 to the previously programmed frequency. For example, reference oscillator 201 is able to provide an accurate and stable frequency control signal to VCO 204 since reference oscillator 201 was not powered down during the sleep mode. In addition, transistor Q1 of VCO 204 is a low power transistor with a very low noise figure, providing a low phase noise source for the transmitter and the local oscillator. Low power reference oscillator 201 operates at the point of lowest noise figure thereby minimizing phase noise produced by oscillator section 200.

Figure 6B:
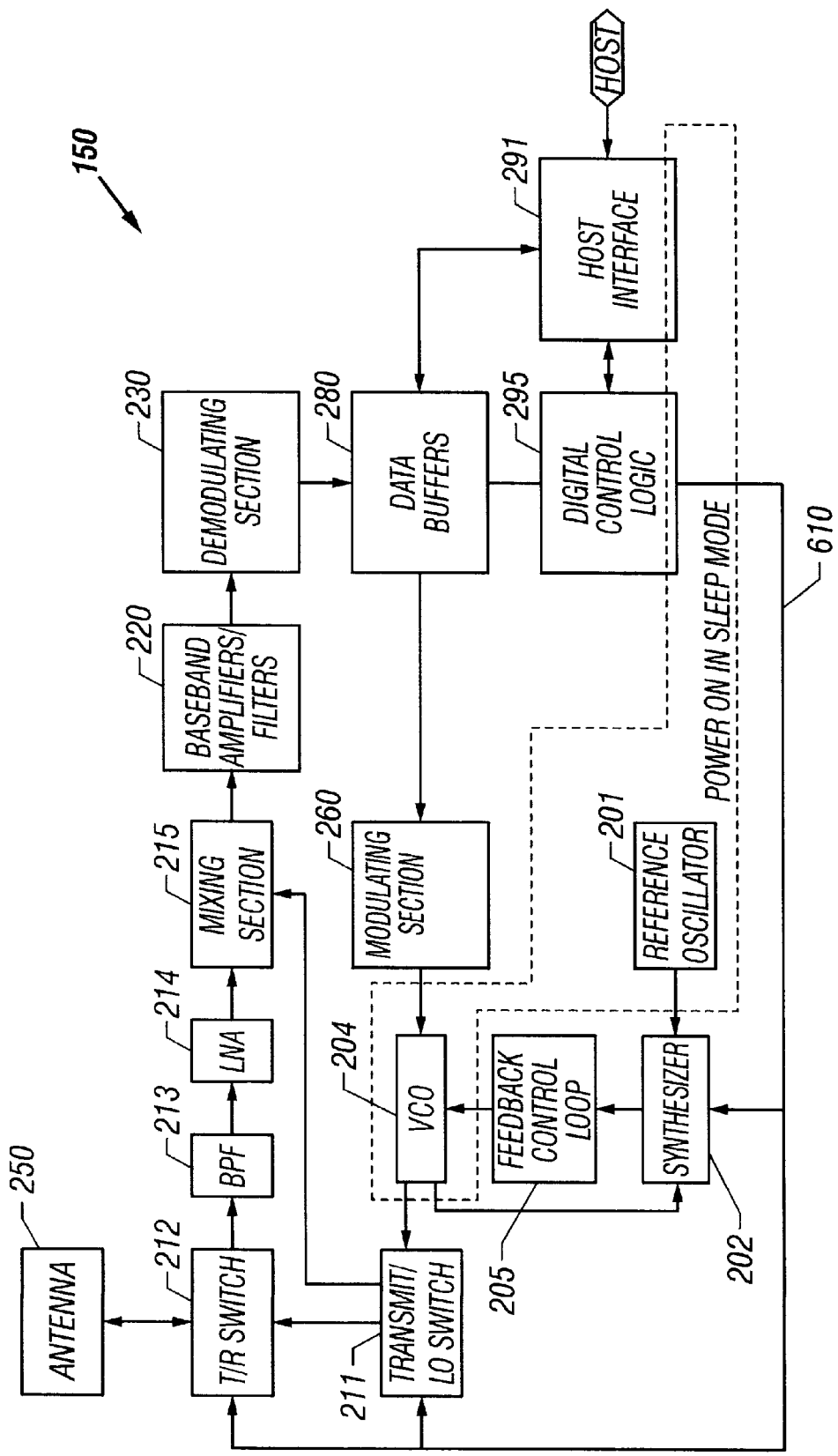
FIG. 6B is a block diagram illustration of transceiver 150 in which the portion indicated within the dashed lines 610 is illustrated in connection with a functional description of the sleep mode.
Figure 6C:
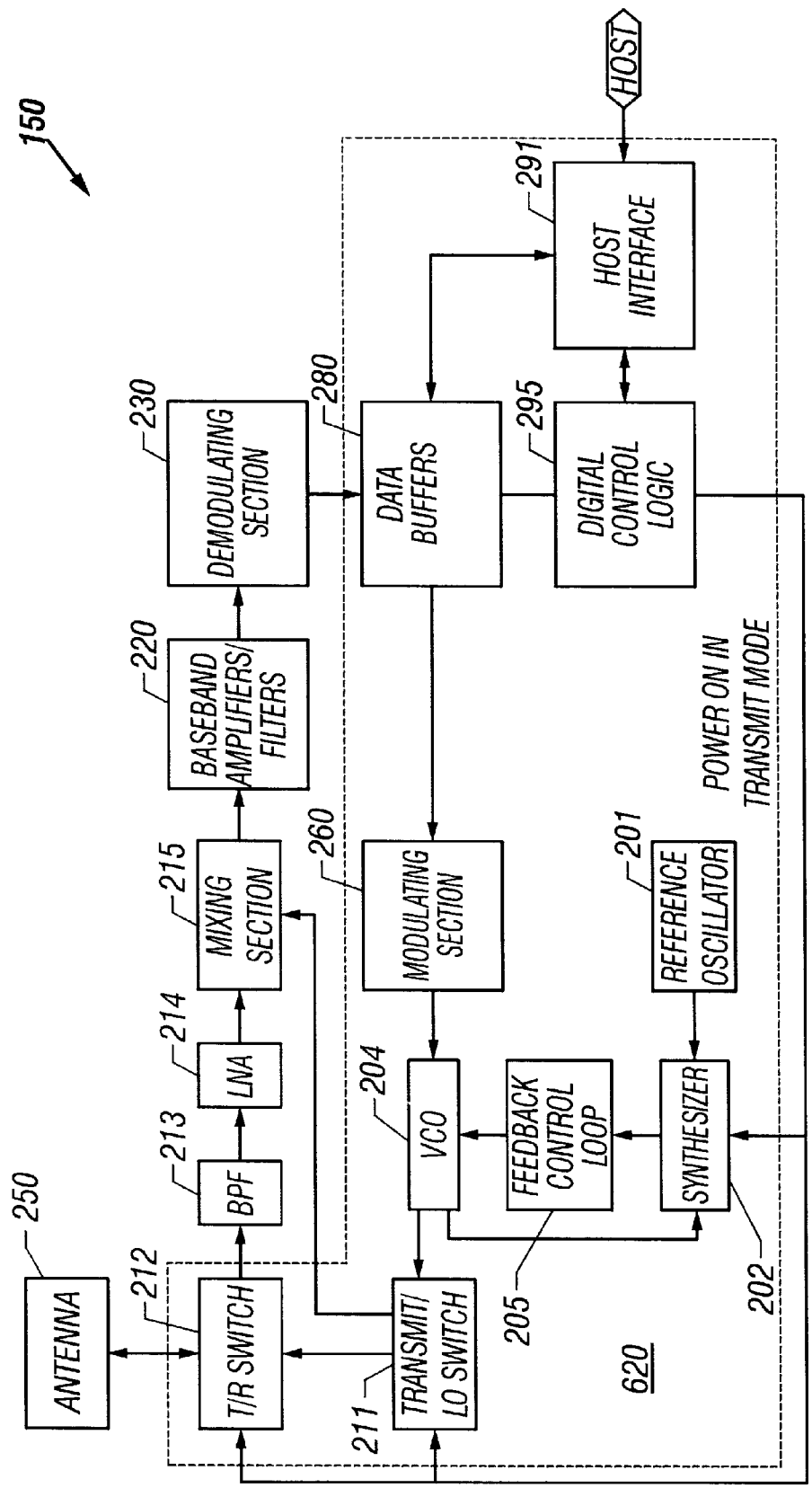
FIG. 6C is a block diagram representation of transceiver 150 with the portions within dashed lines indicating those sections which are actively powered during the transmit mode.
Figure 6D:
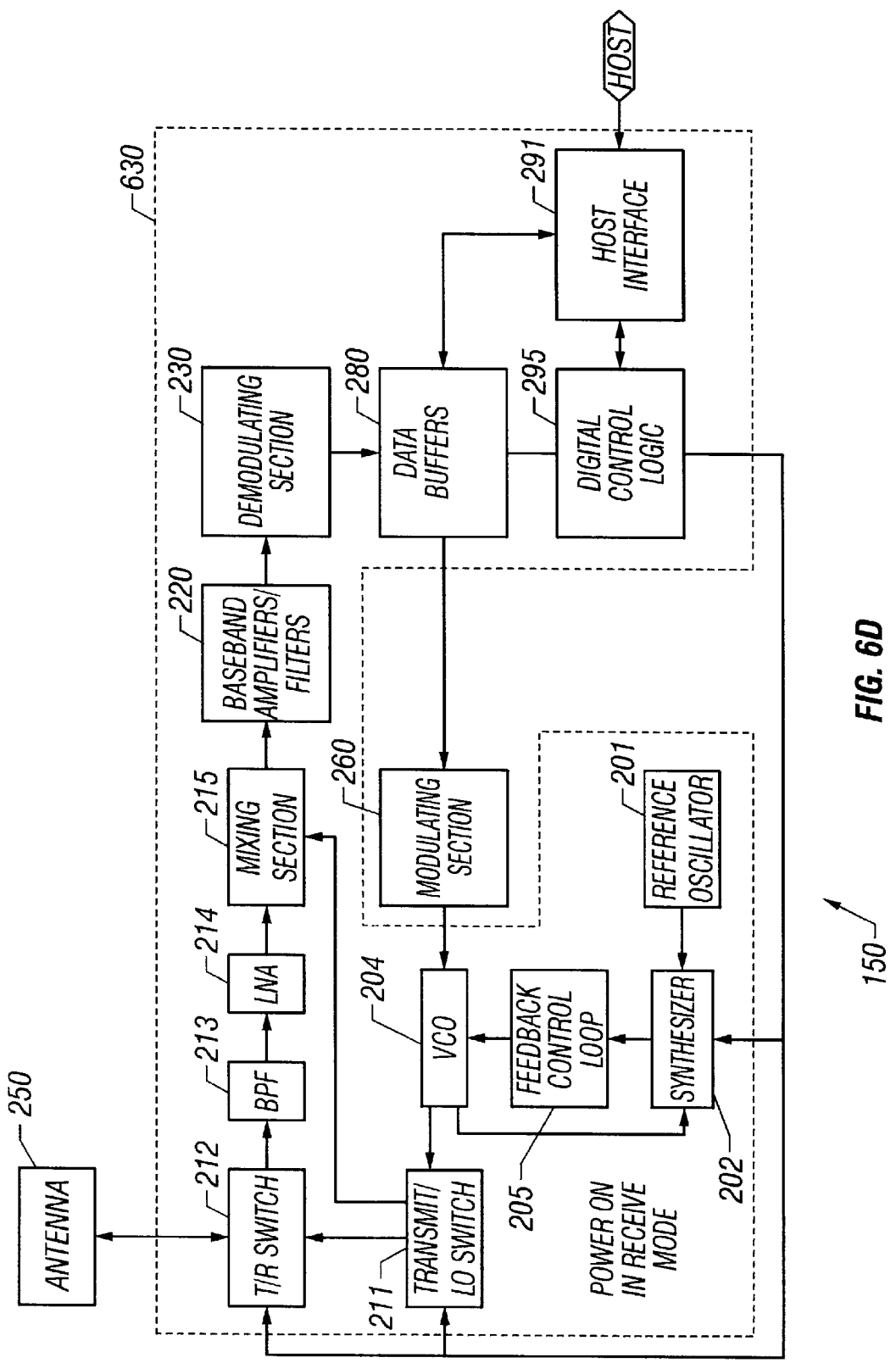
FIG. 6D is a block diagram illustration of transceiver 150 with the dashed line portions used to indicate the powered sections during a receiver mode.

The receiving portion of transceiver 150 is programmed to power down, i.e., enter sleep mode, for a predetermined period of time when not in use for receiving a message or listening for other transmissions prior to transmitting, as shown in FIG. 6B. In contrast, FIGS. 6C and 6D show the active portions (powered) 620, 630 of transceiver 150 during the respective transmit and receive modes, respectively.

The power down cycle is compatible with the transmitting portion of transceiver 150 which is responsible for generating a wake-up transmission message, comprising a series of attention packets. As such, transceiver 150 is provided with automatic (timeout) wake-up protocol as well as interrupt driven wake-up protocol. In this embodiment, transceiver 150 spends most of the time off-line, i.e., in sleep mode, with packet retransmissions spacing timed to assure the wake-up of an intended receiving transceiver and acquisition of incoming data.

Figure 7A:
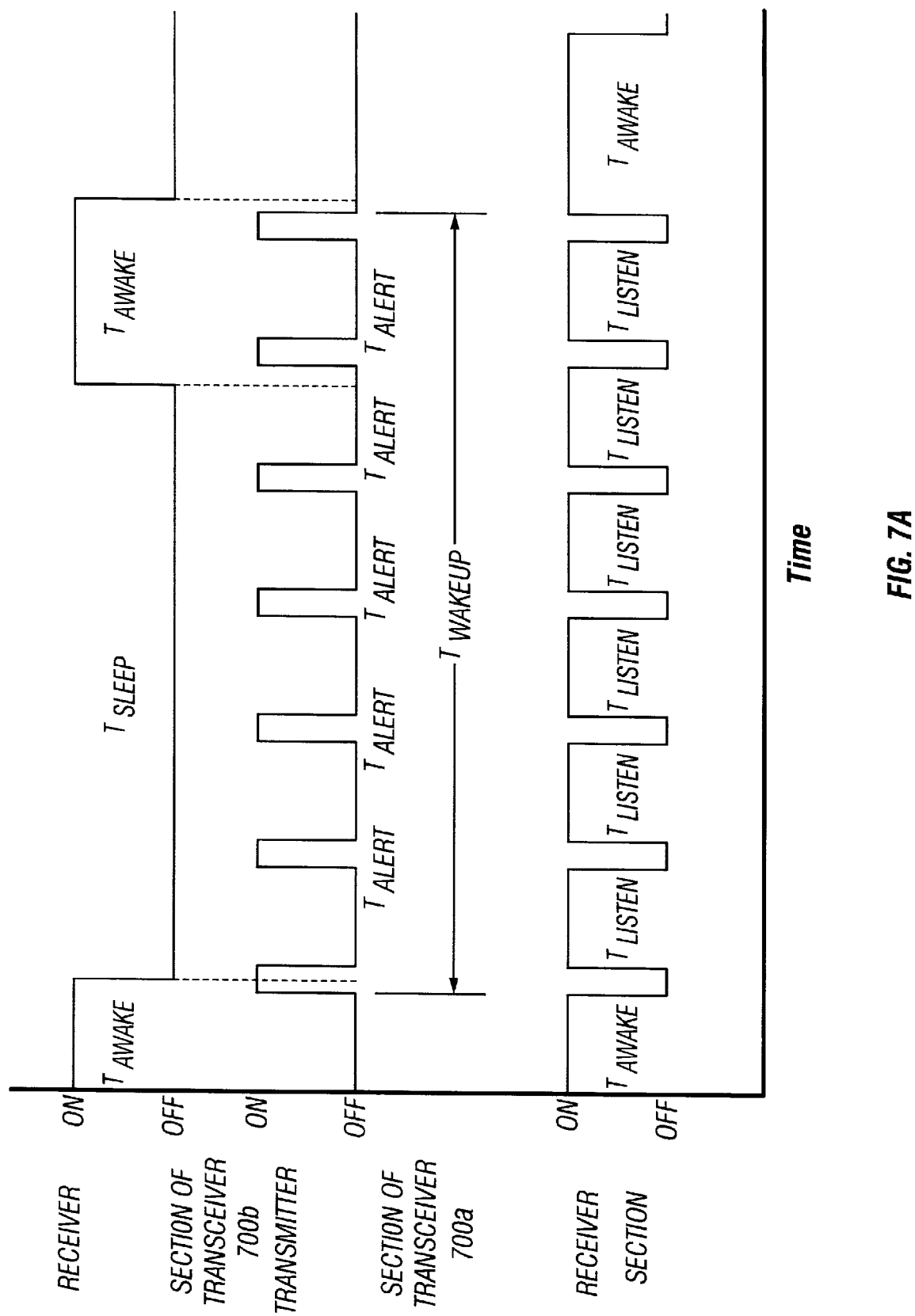
FIG. 7A is a timing diagram illustrating a typical connection sequence between two transceivers.

FIG. 7A is a timing diagram illustrating a typical connection sequence between a first transceiver 700a, with timing shown for the transmitter and receiver sections of transceiver 700a, attempting to awaken a second transceiver 700b which is in sleep mode. In FIG. 7A timing is shown only for the receiving section of transceiver 700b. Note that the respective timing periods shown in FIG. 7A are governed by the following equations:

$$T_{awake} > (T_{listen} + 2T_{alert})$$

and $$T_{wakeup} > (T_{sleep} + T_{awake})$$

A typical walkup sequence is as follows. First, transceiver 700a transmits a wake-up sequence comprising a series of attention packets which must coincide with at least one monitoring period of transceiver 700b while transceiver 700b is in the sleep mode. In other words, the attention packets of first transceiver 700a must be transmitted often enough so that sleeping transceiver 700b will receive at least one attention packet during an awake period. Hence transceiver 700a is programmed to send attention packets for slightly longer than the predetermined sleep period $T_{sleep}$ of transceiver 700b. This overlap allows two asynchronous transceivers, i.e., transceiver 700a and transceiver 700b, to establish connection without the necessity of having means for synchronization.

When transceiver 700b is monitoring (temporarily awake) and receives an attention (wake-up) packet from transceiver 700a, transceiver 700b terminates its sleep mode and sends an acknowledge signal ACK to calling transceiver 700a thereby authorizing transceiver 700a to send its message. The average power consumed in transmitting a typical message (packet) is typically much less than the power required to keep either transceiver on standby (sleep mode) status and ready to be activated.

The communications interface of transceiver 700a to host computer 100 remains powered down until a hardware interrupt is generated as a result of an 'Ack' from transceiver 700b. Before attempting to transmit, transceiver 700a listens for other active transceiver(s) transmitting on the same frequency. If a third transceiver is active, transceiver 700a is powered down for a fixed (or random) period of time so as to conserve power while it is waiting for the third transceiver to stop transmitting.

Figure 7B:
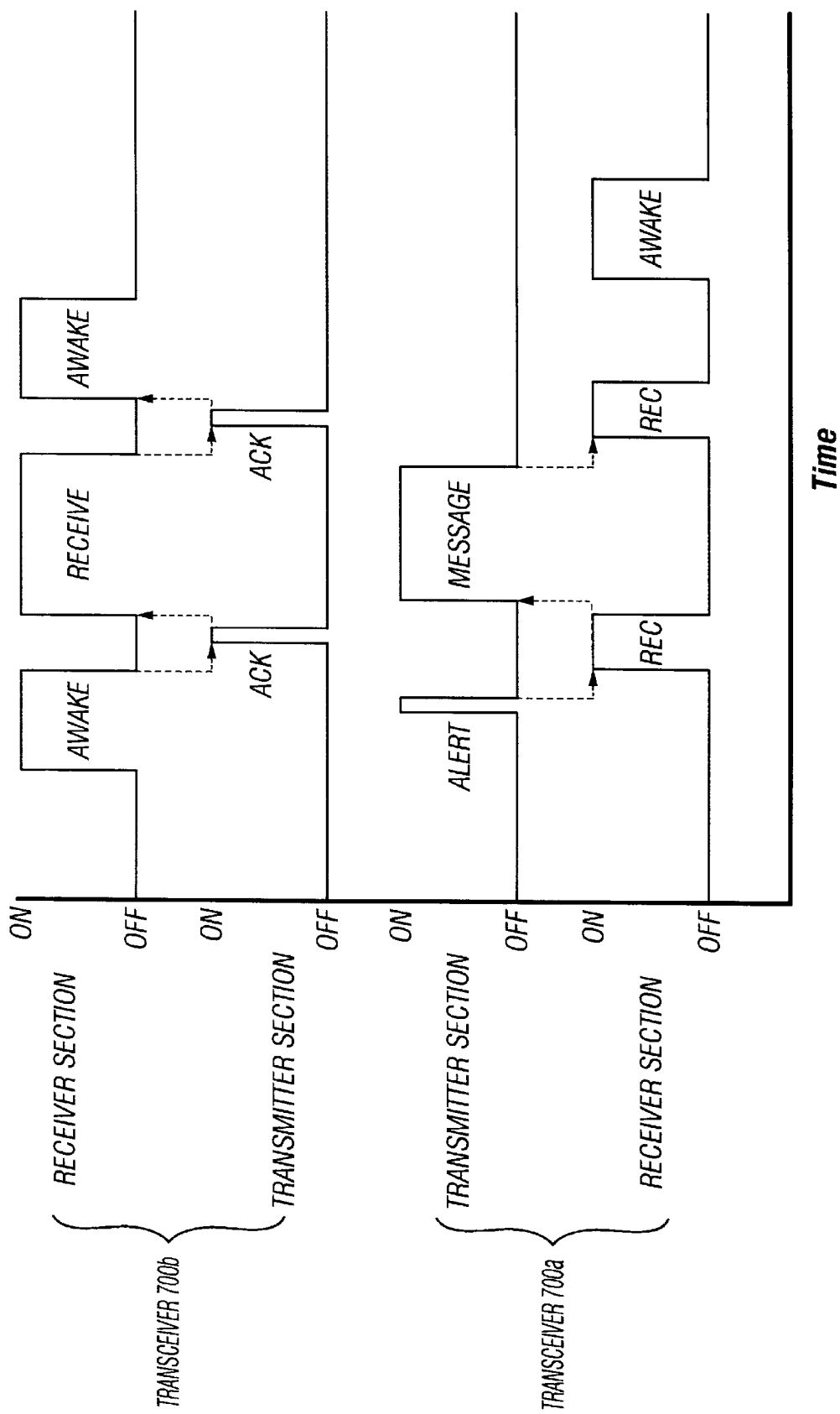
FIG. 7B illustrates a typical protocol for sending a single message (data packet) from one transceiver to another.

FIG. 7B illustrates the protocol for sending a single message (packet) from transceiver 700a to transceiver 700b. Upon awakening, transceiver 700b sends an acknowledge signal "ACK" to transceiver 700a which is expecting the "ACK" signal. Transceiver 700a is then free to send the message (packet) to transceiver 700b.

Figure 7C:
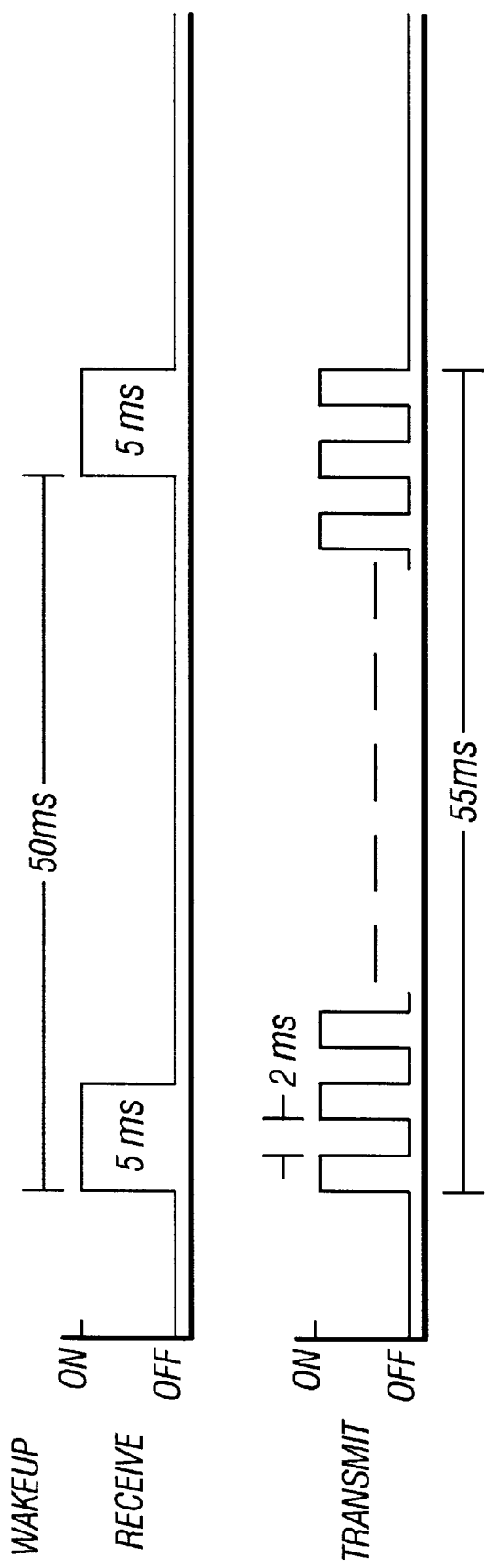
FIG. 7C shows the duty cycle of the receiving section of the transceiver.

The duty cycle of the receiving section of transceiver 700b is illustrated in FIG. 7C. Typical operating parameters for the receiving section of a transceiver such as transceiver 150 are 100 mA at 5 volts (500 mW). Hence a duty cycle of 10:1 or 10% results in an average current of 10 mA, i.e. 50 mW.

As discussed above, power conservation is further improved by gating the clock of transceiver 150 off to inputs of digital circuits when various circuits are not required for active functions. However, reference oscillator 201 is continuously running, i.e. remains powered. During the sleep mode, all circuits other than the wake-up circuits have the clock inputs gated off so they draw only static power. Reference oscillator 201 is crystal controlled for stability and low phase noise. Upon wake-up, the normal clock circuits driven by CLK are switched on and remain on to provide a faster recovery to the required operational accuracy.

Figure 8:
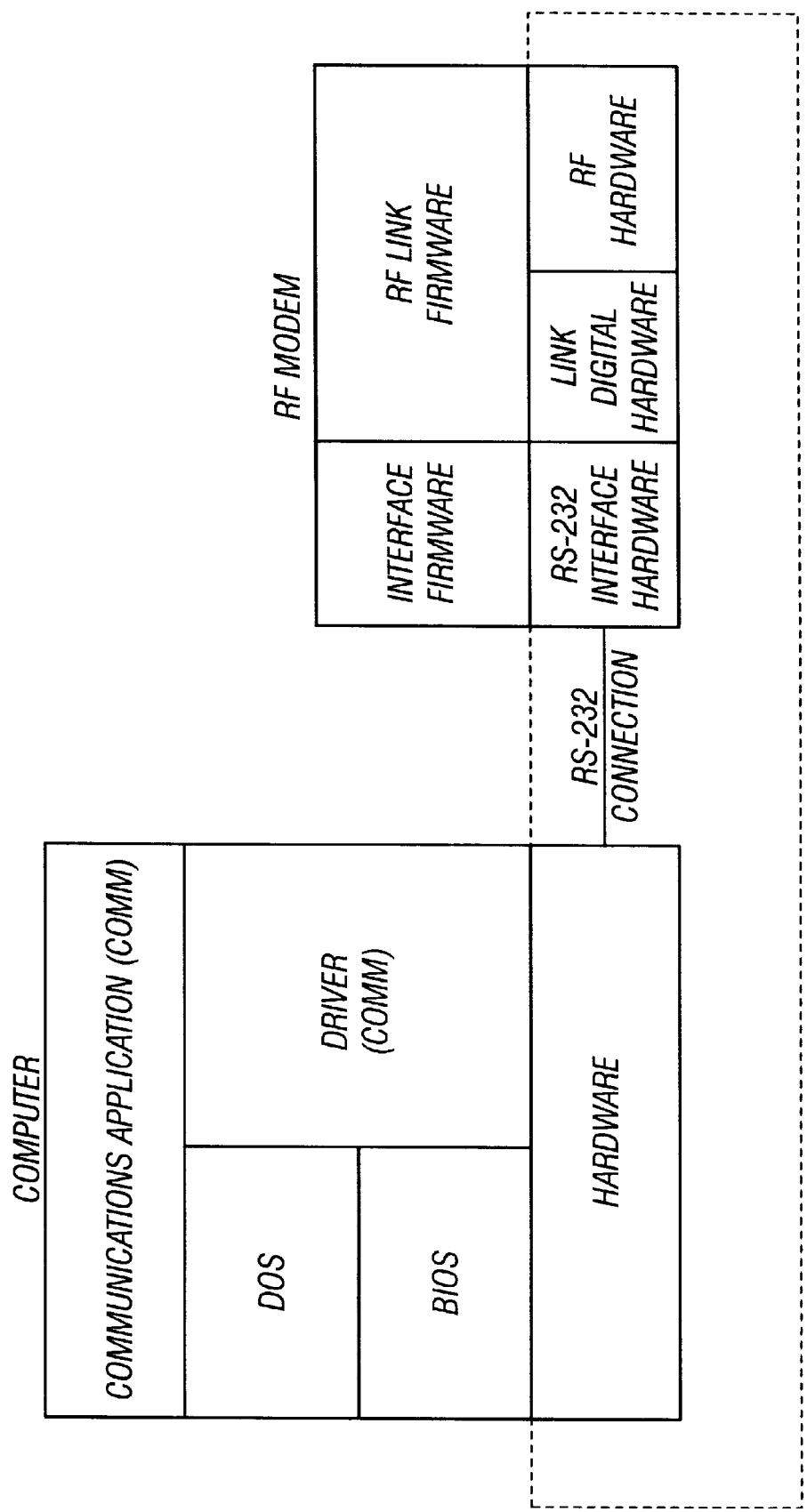
FIG. 8 is a block diagram illustrating software for an RF modem using the serial port (RS-232) and an AT-type command set.

In one embodiment in accordance with the invention, a block diagram, of the software interface as shown in FIG. 8, the Hayes "AT" command set which is compatible with wire-line modems is adopted, permitting the use of standard commercial software packages. Table II shows the "AT" command set. Further, by using a standard COM port or implementing an interface that emulates a standard UART (addressable as a COM port) on the host computer bus, the interface appears to the host computer (software) as though it is communicating over an internal Communications (COM) port.

TABLE II

"AT Command Set"
The AT command set implemented in the RF modem is a very small subset of the regular AT command set implemented in most Hayes compatible 9600/2400 baud modems. The implemented commands are:

| Command | Description |
|---|---|
| DpN | dial RF modem with node ID n where n is a number of 4 to 12 HEX digits |
| DTn | dial RF modem with node ID n, where n is a number of 4 to 12 HEX digits |
| E0 | disable command state character echo |
| E1* | enable command state character echo |
| I0 | Return product ID and firmware version number |
| Q0* | RF modem returns result code |
| Q1 | RF modem does not return result code |
| V0 | Result code displayed in numeric form |
| V1* | Result codes displayed in verbose (english) form |
| S0 = n | n is non-zero for auto-answer, 0 for no answer, default is 0 |

*indicates default settings
Note ID less than 12 digits long is padded with trailing zeroes.

Since the X command is not implemented, the default X command setting is X1.

Since &C and &D commands are not implemented, the default is &C1&D2. This means that carrier is asserted while there is an RF link.

As discussed above, transceiver 150 implements a Carrier Sense Multiple Access (CSMA) protocol with Collision Avoidance (CA). This protocol allows the operation of multiple transceivers on the same frequency, and in the same service area, without interference.

The Carrier Sense Multiple Access with Collision Avoidance (CSMA/CA) protocol is superior because it requires a transceiver to listen before transmitting, thereby minimizing collisions. Collisions can only occur in the brief period between the end of the listening period and the start of a transmission. If a collision does occur, both transceivers experiencing the collision are required to wait a random time period before trying a transmission in order to minimize the probability of a second collision.

In addition, in this embodiment, packets are automatically retransmitted upon error detection, providing a higher level of reliability than is otherwise available by a conventional simple direct communication protocol over a wireless link. The time delay before retransmission is preferably set to the maximum time that the receiving portion of transceiver 700*b* needs to check for errors and send back an "ACK". Typically, the number of retries is set to a default number, such as one hundred (100), but may be reset to a larger or smaller number by a particular software application or to match a network environment.

In this embodiment, error detection is accomplished by check bytes which are the remainder of the sum of the bytes in a data packet. In the transmitter all bytes are added to fill a two byte sum and the overflow from the 16 bits is discarded. The complement of this binary number is transmitted after the data bytes. In the receiver the same summation is performed and the remainder added to the transmitted complement, again with the overflow discarded. The sum of the remainder and complement with overflow discarded should be zero if there have been no errors. This provides simple but effective error detection.

Transceiver 150 could provide frequency agility by the addition of software, firmware and/or hardware, permitting a frequency change during operation. In this embodiment, automatic frequency agility would be implemented in firmware. This would provide flexible algorithms that could be tailored to a specific installation or environment. A default frequency agility algorithm could be incorporated in transceiver 150 and could then be overridden by the applications software if needed. In some applications, the frequency agility firmware could permit the application software to reprogram the synthesizer 202 to a particular frequency or channel, in accordance to an algorithm optimized for that application.

Frequency Agility Implementation

Frequency agility is incorporated by the addition of external software to change the frequency of the transceiver, or by additional internal firmware. Internal firmware provides automatic frequency agility operation, and the use of external frequency agility allows the algorithms to be tailored to a specific installation environment. The internal firmware makes use of signature detection, implemented either in firmware or hardware, to provide a means of acquiring the channel being used for communications. This channel may be arbitrary within a band if channels are well defined in advance by hardware or firmware selection to minimize the number of channels that must be searched. The basic principle is to examine a channel for a brief time to detect an embedded pair of signature bytes which occur at frequent intervals. A typical algorithm would be to assign channels in advance in a priority order, skipping around within the band to maximize the probability of finding a clear channel. The transceivers would all operate on the same initial "calling" channel, but if a message is not acknowledged within a programmable number of tries the transmitter would change to the next channel in the priority list and continue trying to get the packet through.

A receiver expecting a message would listen for the period required to receive at least two signatures in a message, and if none is received it would proceed to the next priority channel. Since the receiver can very quickly determine that one of its network transceivers is transmitting in a channel it can scan the channels much faster than the transmitter can. This allows the receiver to catch the transmitter and communicate with it.

A possible algorithm is to use a calling channel, and if the intended receiver identifies a valid signature it can look for its address. Even a noisy channel will usually allow some data to get through, but may not allow a complete packet. If a packet is not correct the receiver sends a not-acknowledge (NACK) to the transmitter which after a programmable number of NACKs will move to the next priority channel and try again. The receiver, no longer detecting this transmitter then moves to the next priority channel and if necessary to each channel in turn until it locates the calling transmitter.

A preferred embodiment; N programmable channels, programmable priority list, partially programmable signature word, programmable number of transmitter retries before moving to the next channel, programmable listen time for the receiver before moving to next channel and programmable number of channel searches before going to sleep. Example default values; 8 channels, priority channels 1-8-4-6-2-7-3-5, signature words w1-w2-w3-w4-w5-w6-w7-w8, retries=10, listen time 2 milliseconds and 5 channel searches before going to sleep. Setting priority channel list to zero disables frequency agility. Two transceivers can operate together as long as they have the same channels and the same channel signatures. The priority lists, transmit retries, listen times, and channel searches need not be the same in the two transceivers for them to communicate.

Variations of the PCMCIA form factor are also possible, e.g. the extended 1.5 inch. Other interfaces between PCMCIA form factor of transceiver 150 and host computer 100 are also possible, including a parallel bus interface, a serial port, e.g. (LPT) line printer port, and a modem emulating interface.

FIG. 8 illustrates the hardware and software blocks utilized to implement an RF modem.

While this invention has been described with reference to particular embodiments, this description is not intended to be limiting, and other embodiments within the scope of the present invention are possible. Thus, while this invention has been described using an RF transceiver in a PCMCIA form factor, the principles of this invention apply equally to the use of wireless communication in a network environment.

We claim:

1. A radio frequency (RF) transceiver comprising:

an RF transmitter section;

an RF receiver section;

an antenna terminal;

a transmit/receive (T/R) switching section comprising a first and a second switch, said T/R switching section having an RF transmit input terminal for receiving an RF transmit signal, a receiver input terminal coupled to said antenna terminal, a receiver output terminal coupled to said RF receiver section, an RF output terminal coupled to said antenna terminal, and control signal input terminals, said first switch of said T/R switching section being operable to selectively connect said receiver input terminal to said receiver output terminal, and said second switch of said T/R switching section being operable to selectively connect said RF transmit input terminal to said RF output terminal;

a transmit/local oscillator (T/LO) switching section comprising a first and a second switch, said T/LO switching section having an RF transmit input terminal for receiving RF transmit signals from the RF transmitter section, a local oscillator input terminal for receiving a local oscillator signal, an RF transmit output terminal, a local oscillator output terminal for providing a local oscillator signal to said RF receiver section, and control signal input terminals, said first switch of said T/LO switching section being operable to selectively connect said RF transmit input terminal to said RF transmit output terminal, and said second switch of said T/LO switching section being operable to selectively connect said local oscillator input terminal to said local oscillator output terminal;

means coupling said RF transmit output terminal of said T/LO switching section to said RF transmit input terminal of said T/R switching section; and a control circuit coupled to said control input terminals of said T/R switching section and said T/LO switching section, said control circuit including means for providing transmit mode control signals to said T/R switching section and said T/LO switching section, wherein in response to receipt of transmit mode control signals said first switch of said T/LO switching section is closed and said second switch of said T/LO switching section is opened, and further wherein said first switch of said T/R switching section is opened and said second switch of said T/R switching section is closed.

2. A radio frequency (RF) transceiver according to claim 1, wherein said control circuit further includes means for providing receive mode control signals to said control input terminals of said T/R switching section and said T/LO switching section, wherein in response to receipt of receive mode control signals, said first switch of said T/R switching section is closed and said second switch of said T/R switching section is opened, and further wherein said first switch of said T/LO switching section is opened and said second switch of said T/LO switching section is closed.

3. A radio frequency (RF) transceiver according to claim 1, wherein said first and second switches of said T/R switching section, and said first and second switches of said T/LO switching section each comprise field effect transistor devices.

* * * * *